United States Patent
Li et al.

(10) Patent No.: US 12,495,438 B2
(45) Date of Patent: Dec. 9, 2025

(54) NR-LIGHT RANDOM ACCESS RESPONSE REPETITION

(71) Applicant: Qualcomm Incorporated, San Diego, CA (US)

(72) Inventors: Qiaoyu Li, Beijing (CN); Jing Lei, San Diego, CA (US); Chao Wei, Beijing (CN); Wanshi Chen, San Diego, CA (US); Umesh Phuyal, San Diego, CA (US); Peter Pui Lok Ang, San Diego, CA (US); Krishna Kiran Mukkavilli, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 685 days.

(21) Appl. No.: 17/776,554

(22) PCT Filed: Nov. 28, 2019

(86) PCT No.: PCT/CN2019/121589
§ 371 (c)(1),
(2) Date: May 12, 2022

(87) PCT Pub. No.: WO2021/102794
PCT Pub. Date: Jun. 3, 2021

(65) Prior Publication Data
US 2022/0400511 A1   Dec. 15, 2022

(51) Int. Cl.
*H04W 74/00* (2009.01)
*H04W 24/08* (2009.01)
(Continued)

(52) U.S. Cl.
CPC ......... *H04W 74/002* (2013.01); *H04W 24/08* (2013.01); *H04W 74/0833* (2013.01); *H04W 74/0836* (2024.01)

(58) Field of Classification Search
CPC ............................ H04W 74/002; H04W 24/08
See application file for complete search history.

(56) References Cited

U.S. PATENT DOCUMENTS

| | | | |
|---|---|---|---|
| 2009/0011769 A1 | 1/2009 | Park et al. | |
| 2017/0141833 A1* | 5/2017 | Kim | ...................... H04W 24/08 |

(Continued)

FOREIGN PATENT DOCUMENTS

| | | |
|---|---|---|
| CN | 105453477 A | 3/2016 |
| CN | 105637969 A | 6/2016 |

(Continued)

OTHER PUBLICATIONS

International Search Report and Written Opinion—PCT/CN2019/121589—ISAEPO—Aug. 21, 2020.

(Continued)

*Primary Examiner* — Mohammad S Adhami
*Assistant Examiner* — Weibin Huang
(74) *Attorney, Agent, or Firm* — Holland & Hart LLP

(57) ABSTRACT

Methods, systems, and devices for wireless communications are described. A group of random access channel opportunities are identified over which to transmit a preamble associated with a random access channel procedure. A preamble sequence group associated with the identified group of random access channel opportunities is determined based on a repetition level associated with the preamble sequence group. At least one downlink message associated with the random access channel procedure is received based on the repetition level.

29 Claims, 19 Drawing Sheets

(51) Int. Cl.
*H04W 74/0833* (2024.01)
*H04W 74/0836* (2024.01)

(56) References Cited

U.S. PATENT DOCUMENTS

| | | | | |
|---|---|---|---|---|
| 2018/0176957 | A1* | 6/2018 | Zhang | H04L 1/00 |
| 2019/0305899 | A1* | 10/2019 | Rico Alvarino | H04L 1/0047 |
| 2019/0313456 | A1* | 10/2019 | Liu | H04W 88/023 |
| 2020/0359425 | A1* | 11/2020 | Chen | H04L 1/08 |
| 2022/0150982 | A1* | 5/2022 | Lee | H04W 74/0833 |
| 2023/0028843 | A1* | 1/2023 | Sun | H04B 7/0626 |
| 2023/0082998 | A1* | 3/2023 | Kim | H04W 52/0206 370/329 |

FOREIGN PATENT DOCUMENTS

| | | |
|---|---|---|
| CN | 106686691 A | 5/2017 |
| CN | 107409421 A | 11/2017 |
| CN | 108668361 A | 10/2018 |
| CN | 110049574 A | 7/2019 |
| CN | 110087253 A | 8/2019 |
| EP | 3249993 A1 | 11/2017 |
| WO | WO-2007078165 A1 | 7/2007 |
| WO | WO-2016159372 A1 | 10/2016 |

OTHER PUBLICATIONS

Ericsson: "Remaining Issues on Random Access for Rel-13 Low Complexity and Enhanced Coverage UEs", 3GPP TSG-RAN WG2 #91bis, R2-154788, 3rd Generation Partnership Project, Mobile Competence Centre, 650, Route Des Lucioles, vol. RAN WG2, No. Malmo. Sweden, Oct. 5-9, 2015, Oct. 4, 2015, XP051040325, pp. 1-8, Section 2.1, p. 2.
Supplementary European Search Report—EP19953730—Search Authority—The Hague—Jul. 14, 2023.

* cited by examiner

NR-LIGHT RANDOM ACCESS RESPONSE REPETITION

CROSS REFERENCE

The present application is a 371 national stage filing of International PCT Application No. PCT/CN2019/121589 by Li et al., entitled "NR-LIGHT RANDOM ACCESS RESPONSE REPETITION," filed Nov. 28, 2019, which is assigned to the assignee hereof, and which is expressly incorporated by reference in its entirety herein.

BACKGROUND

The following relates generally to wireless communications, and more specifically to New Radio (NR)-Light random access response (RAR) repetition.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may support one or more random access procedures (e.g., a UE may perform a random access procedure during initial access to establish a connection with the network). The random access procedures may involve a series of handshake messages exchanged between UEs and base stations using random access time/frequency resources. Random access procedures may include contention based random access (CBRA) procedures where the device must contend for the channel before attempting access and contention free random access (CFRA) procedures where resources are preconfigured for the device. In some aspects, the random access procedures may be performed on a physical random access channel (PRACH) and may involve exchanging one or more random access channel (RACH) signals (e.g., a RACH message 1 (msg1), RACH message 2 (msg2), and the like).

SUMMARY

The described techniques relate to improved methods, systems, devices, and apparatuses that support New Radio (NR)-Light random access response (RAR) repetition. Generally, the described techniques provide for improved random access procedures for user equipment (UEs). According to some aspects, UEs with reduced capabilities (e.g., low complexity UEs, low tier UEs, NR-Light devices, Internet of Things (IoT) devices, etc.) may leverage repetitions of downlink messages (e.g., RARs) of random access procedures, which may provide for more efficient random access procedures for such UEs.

For example, a UE may be configured with a set of random access channel (RACH) occasion (RO) groups, where each RO group may be associated with a preamble format. Further, each RO group (e.g., each preamble format) may be configured with one or more preamble sequence groups, where each preamble sequence group may be associated with a repetition level (e.g., a repetition level preference of the UE) for at least one downlink message (e.g., a RAR) of a RACH procedure. That is, RO groups may be configured to divide preamble sequences into multiple groups (e.g., preamble sequence groups), where each preamble sequence group may be associated with a downlink repetition level preference of the UE (e.g., downlink repetition level preference for RACH procedures with a based station). As such, a UE may transmit a first message of a RACH procedure (e.g., a RACH preamble, a RACH message 1 (msg1), a RACH message A (msgA)) according to a preamble sequence group corresponding to a selected repetition level, and the UE may receive a downlink message of the RACH procedure (e.g., a RAR, a RACH message 2 (msg2), a RACH message B (msgB)) that may be transmitted by a base station according to the selected repetition level.

In some cases (e.g., for two step RACH procedures), a UE may determine a repetition level preference for a downlink message associated with the RACH procedure, and the UE may transmit a preamble associated with the RACH procedure as well as an indication of the repetition level preference. For example, in cases where physical uplink shared channel (PUSCH) is included in a first message of a RACH procedure (e.g., such as in msgB of a two step RACH procedure), a UE may indicate its downlink repetition level preference in PUSCH and transmit the indication along with a preamble in the first message (e.g., in the msgB). Additionally or alternatively, the UE may indicate its downlink repetition level using radio resource control (RRC) signaling, medium access control (MAC) control element (CE), uplink control information (UCI), etc.

A method of wireless communication at a UE is described. The method may include identifying a group of random access channel opportunities over which to transmit a preamble associated with a random access channel procedure, determining a preamble sequence group associated with the identified group of random access channel opportunities based on a repetition level associated with the preamble sequence group, and receiving at least one downlink message associated with the random access channel procedure based on the repetition level.

An apparatus for wireless communication at a UE is described. The apparatus may include a processor, memory coupled with the processor, and instructions stored in the memory. The instructions may be executable by the processor to cause the apparatus to identify a group of random access channel opportunities over which to transmit a preamble associated with a random access channel procedure, determine a preamble sequence group associated with the identified group of random access channel opportunities based on a repetition level associated with the preamble sequence group, and receive at least one downlink message associated with the random access channel procedure based on the repetition level.

Another apparatus for wireless communication at a UE is described. The apparatus may include means for identifying a group of random access channel opportunities over which to transmit a preamble associated with a random access channel procedure, determining a preamble sequence group associated with the identified group of random access channel opportunities based on a repetition level associated with the preamble sequence group, and receiving at least one downlink message associated with the random access channel procedure based on the repetition level.

A non-transitory computer-readable medium storing code for wireless communication at a UE is described. The code may include instructions executable by a processor to identify a group of random access channel opportunities over which to transmit a preamble associated with a random access channel procedure, determine a preamble sequence group associated with the identified group of random access channel opportunities based on a repetition level associated with the preamble sequence group, and receive at least one downlink message associated with the random access channel procedure based on the repetition level.

Some examples of the method, apparatuses, and non-transitory computer-readable medium described herein may further include operations, features, means, or instructions for receiving a configuration of a set of groups of random access channel opportunities and a set of preamble sequence groups associated with each group of random access channel opportunities, where the group of random access channel opportunities may be identified based on the received configuration. In some examples of the method, apparatuses, and non-transitory computer-readable medium described herein, the configuration includes repetition level parameters for each preamble sequence of the set of preamble sequence groups associated with each group of random access channel opportunities.

In some examples of the method, apparatuses, and non-transitory computer-readable medium described herein, the repetition level parameters include a random access radio network temporary identifier, a control resource set, a search space, a number of search space repetitions, a search space repetition pattern, a control channel element aggregation level candidate, a random access response window length, or some combination thereof. In some examples of the method, apparatuses, and non-transitory computer-readable medium described herein, the at least one downlink message may be received based on the received configuration and the determined preamble sequence group. In some examples of the method, apparatuses, and non-transitory computer-readable medium described herein, the configuration may be received in remaining minimum system information.

Some examples of the method, apparatuses, and non-transitory computer-readable medium described herein may further include operations, features, means, or instructions for performing one or more signal reception quality measurements associated with a downlink signal on a downlink channel, where the preamble sequence group may be determined based on the one or more signal reception quality measurements. Some examples of the method, apparatuses, and non-transitory computer-readable medium described herein may further include operations, features, means, or instructions for identifying a reception capability of the UE, where the preamble sequence group may be determined based on the reception capability.

Some examples of the method, apparatuses, and non-transitory computer-readable medium described herein may further include operations, features, means, or instructions for selecting the preamble sequence group from a set of preamble sequence groups associated with the identified group of random access channel opportunities based on a repetition level preference for the at least one downlink message, where each preamble sequence group of the set of preamble sequence groups may be associated with a different repetition level for the at least one downlink message.

Some examples of the method, apparatuses, and non-transitory computer-readable medium described herein may further include operations, features, means, or instructions for performing one or more signal reception quality measurements associated with a downlink signal on a downlink channel, and selecting the group of random access channel opportunities from a set of groups of random access channel opportunities based on the one or more signal reception quality measurements, where the preamble sequence group may be selected from the set of preamble sequence groups associated with the selected group of random access channel opportunities.

Some examples of the method, apparatuses, and non-transitory computer-readable medium described herein may further include operations, features, means, or instructions for identifying a transmission capability of the UE, and selecting the group of random access channel opportunities from a set of groups of random access channel opportunities based on the transmission capability of the UE, where the preamble sequence group may be selected from the set of preamble sequence groups associated with the selected group of random access channel opportunities.

In some examples of the method, apparatuses, and non-transitory computer-readable medium described herein, the repetition level preference for the at least one downlink message may be different from a second repetition level preference for at least one uplink message associated with the random access channel procedure. Some examples of the method, apparatuses, and non-transitory computer-readable medium described herein may further include operations, features, means, or instructions for transmitting a preamble sequence based on the determined preamble sequence group, where the at least one downlink message may be received based on the transmitting. In some examples of the method, apparatuses, and non-transitory computer-readable medium described herein, the at least one downlink message includes a message 2 of a four step random access channel procedure.

A method of wireless communication at a UE is described. The method may include determining a repetition level preference for a downlink message associated with a random access channel procedure, transmitting a preamble associated with the random access channel procedure and an indication of the repetition level preference, and receiving the downlink message based on the preamble and the repetition level preference.

An apparatus for wireless communication at a UE is described. The apparatus may include a processor, memory coupled with the processor, and instructions stored in the memory. The instructions may be executable by the processor to cause the apparatus to determine a repetition level preference for a downlink message associated with a random access channel procedure, transmit a preamble associated with the random access channel procedure and an indication of the repetition level preference, and receive the downlink message based on the preamble and the repetition level preference.

Another apparatus for wireless communication at a UE is described. The apparatus may include means for determining a repetition level preference for a downlink message associated with a random access channel procedure, transmitting a preamble associated with the random access channel procedure and an indication of the repetition level preference, and receiving the downlink message based on the preamble and the repetition level preference.

A non-transitory computer-readable medium storing code for wireless communication at a UE is described. The code may include instructions executable by a processor to determine a repetition level preference for a downlink message associated with a random access channel procedure, transmit a preamble associated with the random access channel procedure and an indication of the repetition level preference, and receive the downlink message based on the preamble and the repetition level preference.

Some examples of the method, apparatuses, and non-transitory computer-readable medium described herein may further include operations, features, means, or instructions for receiving a configuration of a set of groups of random access channel opportunities, and identifying a group of random access channel opportunities from the set of groups of random access channel opportunities based on the configuration, where the preamble and the indication may be transmitted based on the identified group of random access channel opportunities. In some examples of the method, apparatuses, and non-transitory computer-readable medium described herein, each group of random access channel opportunities of the set of groups of random access channel opportunities may be associated with a physical uplink shared channel transmission scheme, where the indication may be transmitted based on the physical uplink shared channel transmission scheme corresponding to the identified group of random access channel opportunities.

In some examples of the method, apparatuses, and non-transitory computer-readable medium described herein, the downlink message may be received based on the received configuration. In some examples of the method, apparatuses, and non-transitory computer-readable medium described herein, the configuration may be received in remaining minimum system information. In some examples of the method, apparatuses, and non-transitory computer-readable medium described herein, the indication of the repetition level preference may be transmitted in a physical uplink shared channel message. In some examples of the method, apparatuses, and non-transitory computer-readable medium described herein, the indication of the repetition level preference may be transmitted in radio resource control signaling, a medium access control control element, uplink control information, or some combination thereof. In some examples of the method, apparatuses, and non-transitory computer-readable medium described herein, the downlink message includes a message B of a two step random access control channel procedure.

A method of wireless communication at a base station is described. The method may include receiving a preamble sequence associated with a preamble sequence group of a group of random access channel opportunities, identifying a repetition level associated with the preamble sequence group, and transmitting at least one downlink message associated with a random access channel procedure based on the received preamble sequence and the identified repetition level.

An apparatus for wireless communication at a base station is described. The apparatus may include a processor, memory coupled with the processor, and instructions stored in the memory. The instructions may be executable by the processor to cause the apparatus to receive a preamble sequence associated with a preamble sequence group of a group of random access channel opportunities, identify a repetition level associated with the preamble sequence group, and transmit at least one downlink message associated with a random access channel procedure based on the received preamble sequence and the identified repetition level.

Another apparatus for wireless communication at a base station is described. The apparatus may include means for receiving a preamble sequence associated with a preamble sequence group of a group of random access channel opportunities, identifying a repetition level associated with the preamble sequence group, and transmitting at least one downlink message associated with a random access channel procedure based on the received preamble sequence and the identified repetition level.

A non-transitory computer-readable medium storing code for wireless communication at a base station is described. The code may include instructions executable by a processor to receive a preamble sequence associated with a preamble sequence group of a group of random access channel opportunities, identify a repetition level associated with the preamble sequence group, and transmit at least one downlink message associated with a random access channel procedure based on the received preamble sequence and the identified repetition level.

Some examples of the method, apparatuses, and non-transitory computer-readable medium described herein may further include operations, features, means, or instructions for transmitting a configuration of a set of groups of random access channel opportunities and a set of preamble sequence groups associated with each group of random access channel opportunities, where the repetition level associated with the preamble sequence group may be identified based on the transmitted configuration. In some examples of the method, apparatuses, and non-transitory computer-readable medium described herein, the configuration includes repetition level parameters for each preamble sequence of the set of preamble sequence groups associated with each group of random access channel opportunities.

In some examples of the method, apparatuses, and non-transitory computer-readable medium described herein, the repetition level parameters include a random access radio network temporary identifier, a control resource set, a search space, a number of search space repetitions, a search space repetition pattern, a control channel element aggregation level candidate, a random access response window length, or some combination thereof. In some examples of the method, apparatuses, and non-transitory computer-readable medium described herein, the at least one downlink message may be transmitted based on the transmitted configuration and the identified repetition level. In some examples of the method, apparatuses, and non-transitory computer-readable medium described herein, the configuration may be transmitted in remaining minimum system information. In some examples of the method, apparatuses, and non-transitory computer-readable medium described herein, the at least one downlink message includes a message 2 of a four step random access channel procedure.

A method of wireless communication at a base station is described. The method may include receiving a first message associated with a random access channel procedure, determining a repetition level preference for a downlink message associated with the random access channel procedure based on the received first message, and transmitting the downlink message based on the received first message and the determined repetition level preference.

An apparatus for wireless communication at a base station is described. The apparatus may include a processor, memory coupled with the processor, and instructions stored in the memory. The instructions may be executable by the processor to cause the apparatus to receive a first message associated with a random access channel procedure, determine a repetition level preference for a downlink message associated with the random access channel procedure based on the received first message, and transmit the downlink message based on the received first message and the determined repetition level preference.

Another apparatus for wireless communication at a base station is described. The apparatus may include means for receiving a first message associated with a random access channel procedure, determining a repetition level preference for a downlink message associated with the random access channel procedure based on the received first message, and transmitting the downlink message based on the received first message and the determined repetition level preference.

A non-transitory computer-readable medium storing code for wireless communication at a base station is described. The code may include instructions executable by a processor to receive a first message associated with a random access channel procedure, determine a repetition level preference for a downlink message associated with the random access channel procedure based on the received first message, and transmit the downlink message based on the received first message and the determined repetition level preference.

Some examples of the method, apparatuses, and non-transitory computer-readable medium described herein may further include operations, features, means, or instructions for transmitting a configuration of a set of groups of random access channel opportunities, where the first message may be received based on the transmitted configuration. In some examples of the method, apparatuses, and non-transitory computer-readable medium described herein, each group of random access channel opportunities of the set of groups of random access channel opportunities may be associated with a physical uplink shared channel transmission scheme. In some examples of the method, apparatuses, and non-transitory computer-readable medium described herein, the downlink message may be transmitted based on the transmitted configuration. In some examples of the method, apparatuses, and non-transitory computer-readable medium described herein, the configuration may be transmitted in remaining minimum system information.

In some examples of the method, apparatuses, and non-transitory computer-readable medium described herein, the first message includes a preamble associated with the random access channel procedure and an indication of the repetition level preference. Some examples of the method, apparatuses, and non-transitory computer-readable medium described herein may further include operations, features, means, or instructions for identifying a decoding failure associated with the indication of the repetition level preference, where the downlink message includes a fallback random access response message based on the decoding failure. In some examples of the method, apparatuses, and non-transitory computer-readable medium described herein, the fallback random access response message may be transmitted according to a maximum downlink repetition level configuration.

In some examples of the method, apparatuses, and non-transitory computer-readable medium described herein, the fallback random access response message includes a four step random access channel procedure fall back command or an uplink grant for an uplink shared channel retransmission. In some examples of the method, apparatuses, and non-transitory computer-readable medium described herein, the indication of the repetition level preference may be received in a physical uplink shared channel message. In some examples of the method, apparatuses, and non-transitory computer-readable medium described herein, the indication of the repetition level preference may be received in radio resource control signaling, a medium access control control element, uplink control information, or some combination thereof. In some examples of the method, apparatuses, and non-transitory computer-readable medium described herein, the downlink message includes a message B of a two step random access control channel procedure.

DETAILED DESCRIPTION

Figure 1:
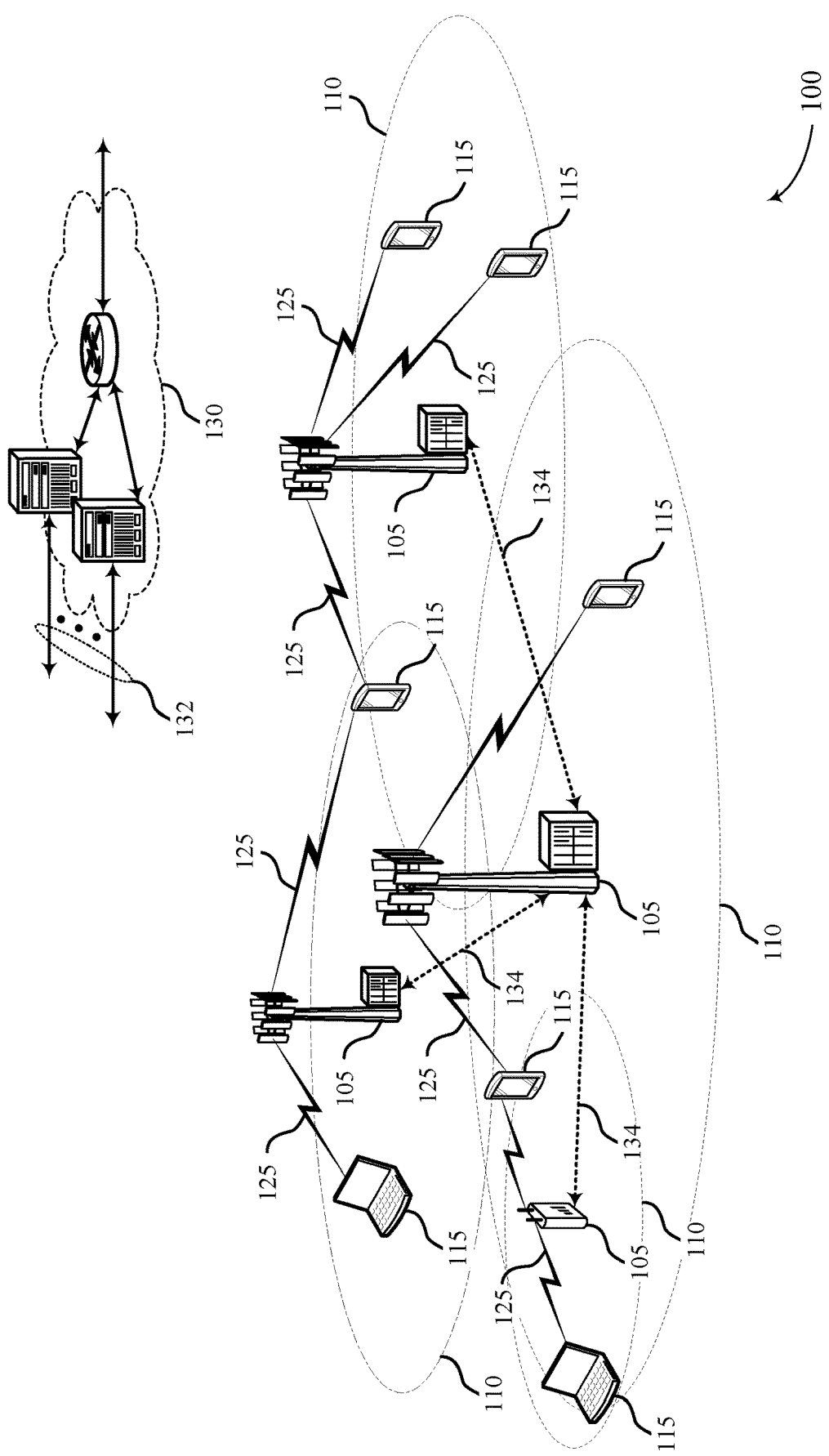
FIG. 1 illustrates an example of a system for wireless communications that supports New Radio (NR)-Light random access response (RAR) repetition in accordance with aspects of the present disclosure.

Some wireless communications systems may support low complexity user equipment (UEs) (e.g., which may be referred to as Light devices, New Radio (NR)-Light devices, low tier devices, Internet of Things (IoT) devices, etc.). A low complexity UE may also be referred to as a low tier UE for which some features, or premium features, may not be needed or useful. For example, low complexity UEs may include sensors (e.g., industrial sensors), cameras (e.g., video monitoring devices), wearable devices, IoT devices, low tier or relaxed devices, etc. Such low complexity UEs may be used in a variety of applications, including healthcare, smart cities, transportation and logistics, electricity distribution, process automation, and building automation. Low complexity UEs may communicate with a base station and operate in the same cell as other, non-low complexity UEs (e.g., which may be referred to as regular UEs, premium UEs, etc.). For example, in some cases, a low complexity UE may be connected to a network via a connection to a base station, in addition to being connected to other UEs (e.g., to one or more premium UEs) via device-to-device (e.g., sidelink) connections.

As such, in some cases, a low complexity UE may perform random access procedures (e.g., to establish a connection with a base station, to achieve uplink synchronization with the base station, etc.). The random access procedure may include a series of handshake messages carrying information that facilitates establishing the connection between the UE and the base station. For example, a network may implement periodic and/or aperiodic time/frequency resources that UEs (e.g., including low complexity UEs) may use to perform random access procedures. In some cases, the series of random access messages, the information carried in random access messages, etc. may depend on the configuration of the random access procedure. For example, a random access procedure may be configured as a four step random access procedure or a two step random access procedure (e.g., where each of the two messages of a two step random access procedure may combine some portions of information conveyed via one or more messages of the four step random access procedure).

However, in some cases, low complexity UEs may be configured with reduced capabilities (e.g., compared to other premium UEs that may operate in same cell as a low complexity UE) that may result in inefficient random access procedures. For example, a low complexity UE may be configured to transmit with a reduced transmit power compared to other non-low complexity devices, may be equipped with a reduced number of receive antennas, may have reduced power consumption capacity, etc. For example, some low complexity UEs may be equipped with a single receive antenna (e.g., which may result in a lower received signal-to-noise ratio (SNR) for a given signal compared to UEs equipped with two receive antennas, four receive antennas, etc.). As such, low complexity UEs may have difficulty or may be unable to successfully receive (e.g., successfully decode and process) downlink messages of random access procedures, which may result in network connection latency, poor network connections, etc.

According to the techniques described herein, UEs with reduced capabilities (e.g., low complexity UEs, low tier UEs, NR-Light devices, Internet of Things (IoT) devices, etc.) may leverage repetitions of downlink messages of random access procedures, which may provide for more efficient random access procedures for such UEs. Generally, any device (e.g., a non-low complexity UE, a premium UE, etc.) may perform the techniques described herein for improved (e.g., more efficient, more robust, etc.) random access procedures. For instance, in some cases, UEs (e.g., high priority UEs, mission critical UEs, low-latency UEs, etc.) with increased numbers of receive antennas (e.g., such as UEs with two receive antennas, four receive antennas, etc.) may perform any aspects of the techniques described herein for more robust random access procedures.

In some examples, a UE may be configured with a set of random access channel (RACH) occasion (RO) groups, where each RO group may be associated with a preamble format. Further, each RO group (e.g., each preamble format) may be configured with one or more preamble sequence groups, where each preamble sequence group may be associated with a repetition level (e.g., a repetition level preference of the UE) for a downlink message (e.g., a random access response (RAR)) of a RACH procedure. That is, RO groups may be configured to divide preamble sequences into multiple groups (e.g., preamble sequence groups), where each preamble sequence group may be associated with a downlink repetition level preference of the UE (e.g., downlink repetition level preference for RACH procedures with a based station). Each preamble sequence group (e.g., each downlink repetition level preference) may be configured (e.g., defined or established) via parameters such as a random access radio network temporary identifier (RA-RNTI), a control resource set (CORESET), a search space (SS), a number of SS repetitions, a SS repetition pattern, control channel element (CCE) aggregation level (AL) candidates, RAR window length, etc.

As such, a UE may identify a RO group and may then determine a preamble sequence group associated with the RO group based on downlink repetition level preferences (e.g., based on parameters associated with the configured preamble sequence group). The UE may transmit a first message of a RACH procedure (e.g., a RACH preamble, a RACH message 1 (msg1), a RACH message A (msgA)) according to the determined preamble sequence group (e.g., which may indicate the repetition level preference of the UE to a base station), and the UE may receive a downlink message of the RACH procedure (e.g., a RAR, a RACH message 2 (msg2), a RACH message B (msgB)) that may be transmitted by the base station according to the selected repetition level. In other words, a base station may identify a preamble sequence group associated with a received RACH preamble, and the base station may transmit a corresponding RAR according to a repetition level corresponding to the preamble sequence group.

In some cases (e.g., for two step RACH procedures), a UE may determine a repetition level preference for a downlink message associated with the RACH procedure, and the UE may transmit a preamble associated with the RACH procedure as well as an indication of the repetition level preference. For example, in cases where physical uplink shared channel (PUSCH) is included in a first message of a RACH procedure (e.g., such as in msgB of a two step RACH procedure), a UE may indicate its downlink repetition level preference in PUSCH and transmit the indication along with a preamble in the first message (e.g., in the msgB). Additionally or alternatively, the UE may indicate its downlink repetition level using radio resource control (RRC) signaling, medium access control (MAC) control element (CE), uplink control information (UCI), etc. In some cases, such explicit indication of repetition level preference may be implemented in cases where configurations may not divide preamble sequences into multiple preamble sequence groups for different DL repetition-level preferences.

The described techniques may provide for improved random access configuration and more efficient random access procedures that may allow low complexity UEs to maintain their intended benefits (e.g., reduced cost due to reduced receive antenna equipment), may allow regular UEs to perform more robust random access procedures, etc. For example, UEs may convey repetition level preferences (e.g., implicitly via preamble sequence group selection, explicitly via transmitting indication of the repetition level preference, etc.) to increase the likelihood of successful random access procedures with a base station (e.g., to increase the likelihood of successful receipt of RARs of a random access procedure). Such may thus result in more efficient random access procedures for reduced random access latency, more robust random access procedures for improved network connections, etc.

Aspects of the disclosure are initially described in the context of a wireless communications system. An example RO configuration diagram and example process flows illustrating aspects of the discussed techniques are then described. Aspects of the disclosure are further illustrated by and described with reference to apparatus diagrams, system diagrams, and flowcharts that relate to NR-Light RAR repetition.

FIG. 1 illustrates an example of a wireless communications system 100 that supports NR-Light RAR repetition in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P)

or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may support low complexity UEs 115 (e.g., which may be referred to as Light devices, NR-Light devices, low tier devices, IoT devices, etc.). A low complexity UE 115 may also be referred to as a low tier UE for which some features, or premium features, may not be needed or useful. For example, low complexity UEs 115 may include sensors (e.g., industrial sensors), cameras (e.g., video monitoring devices), wearable devices, IoT devices, low tier or relaxed devices, etc. Such low complexity UEs 115 may be used in a variety of applications, including healthcare, smart cities, transportation and logistics, electricity distribution, process automation, and building automation. Low complexity UEs 115 may communicate with a base station 105 and operate in the same cell as other, non-low complexity UEs 115 (e.g., which may be referred to as regular UEs, premium UEs, etc.). For example, in some cases, a low complexity UE 115 may be connected to a network via a connection to a base station 105, in addition to being connected to other UEs 115 (e.g., to one or more premium UEs) via device-to-device (e.g., sidelink) connections.

As such, in some cases, UEs 115 (e.g., including low complexity UEs 115) may perform random access procedures (e.g., to establish a connection with a base station 105, to achieve uplink synchronization with the base station 105, etc.). The random access procedure may include a series of handshake messages carrying information that facilitates establishing the connection between the UE 115 and the base station 105. For example, a network may implement periodic and/or aperiodic time/frequency resources that UEs 115 may use to perform random access procedures.

In some cases, the series of random access messages, the information carried in random access messages, etc. may depend on the configuration of the random access procedure. For example, a random access procedure may be configured as a four step random access procedure or a two step random access procedure. A four step random access procedure (e.g., a four step RACH procedure) may include a RACH message 1 (Msg1) (e.g., a PRACH preamble), a RACH message 2 (Msg2) (e.g., a RAR), a RACH message 3 (Msg3) (e.g., a RRC Connection Request), and a RACH message 4 (Msg4) (e.g., a contention resolution and RRC Connection Setup). A two step random access procedure (e.g., a two step RACH procedure) may include a RACH message A (MsgA) (e.g., a PRACH preamble) and a RACH message B (MsgB) (e.g., a RAR). As compared to the four messages (Msg1-Msg4) of a four step random access procedure, for example, the RAR message of the two step random access procedure (e.g., MsgB) may combine all or a portion of the Msg2 and the Msg4 of the four step random access procedure. Further, the random access message of the two step random access procedure (e.g., MsgA) may combine all or a portion of the Msg1 and the Msg3 of the four step random access procedure (e.g., a random access message, or MsgA, may include a preamble and a data payload).

However, in some cases, low complexity UEs 115 may be configured with reduced capabilities (e.g., compared to other premium UEs 115 that may operate in same cell as a low complexity UE 115) that may result in inefficient random access procedures. For example, a low complexity UE 115 may be configured to transmit with a reduced transmit power compared to other non-low complexity devices, may be equipped with a reduced number of receive antennas, may have reduced power consumption capacity, etc. For example, some low complexity UEs 115 may be equipped with a single receive antenna (e.g., which may result in a lower received SNR for a given signal at such a low complexity UE 115 compared to UEs 115 equipped with two receive antennas, four receive antennas, etc.). As such, low complexity UEs 115 may have difficulty or may be unable to successfully receive (e.g., successfully decode and process) downlink messages of random access procedures, which may result in network connection latency, poor network connections, etc.

According to the techniques described herein, UEs 115 with reduced capabilities (e.g., low complexity UEs, low tier UEs, NR-Light devices, Internet of Things (IoT) devices, etc.) may leverage repetitions of downlink messages of random access procedures, which may provide for more efficient random access procedures for such UEs 115. Generally, any device (e.g., a premium UE, non-low complexity UE, a regular UE, etc.) may perform the techniques described herein for improved (e.g., more efficient, more robust, etc.) random access procedures. For instance, in some cases, UEs 115 (e.g., high priority UEs, mission critical UEs, low-latency UEs, etc.) with increased numbers of receive antennas (e.g., such as UEs 115 with two receive antennas, four receive antennas, etc.) may perform any aspects of the techniques described herein for more robust random access procedures.

Figure 2:
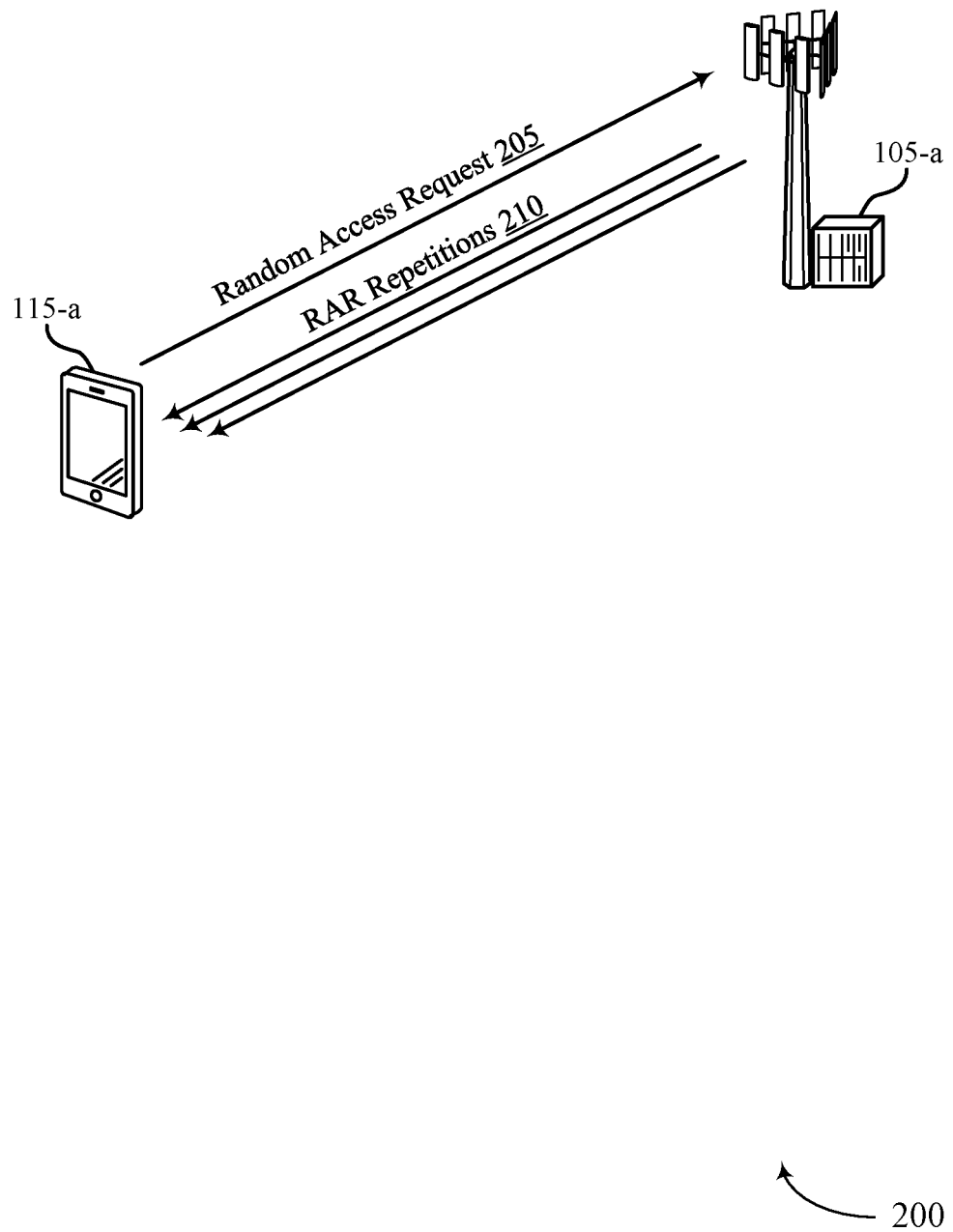
FIG. 2 illustrates an example of a wireless communications system that supports NR-Light RAR repetition in accordance with aspects of the present disclosure.

FIG. 2 illustrates an example of a wireless communications system 200 that supports NR-Light RAR repetition in accordance with aspects of the present disclosure. In some examples, the wireless communications system 200 may implement aspects of the wireless communications system 100 as described with reference to FIG. 1. The wireless communications system 200 includes a base station 105-a and a UE 115-a, which may be examples of the corresponding devices as described with reference to FIG. 1.

In some cases, UE 115-a may perform a connection procedure (e.g., a random access procedure such as a RACH procedure) to establish a connection with base station 105-a. For example, UE 115-a may perform a random access procedure, such as a two step and/or a four step random access procedure (e.g., a two step RACH procedure and/or a four step RACH procedure), to establish a connection to be used to communicate uplink or downlink data transmissions. According to the techniques described herein, wireless communications system 200 may support random access procedures employing RAR repetitions 210 (e.g., Msg2 repetitions for four step random access procedures or MsgB repetitions for two step random access procedures) by base station 105-*a*. The repetition level (e.g., the number of RAR repetitions 210) may be based on UE 115-*a* indication of a repetition level (e.g., a repetition level preference). As discussed herein, such an indication may be based at least in part on a random access request 205 (e.g., based at least in part on a transmitted preamble sequence). For example, an indication of a repetition level may be conveyed via preamble group selection (e.g., a repetition level may be implicitly indicated based on a preamble sequence used to transmit a Msg1) or may be explicitly signaled (e.g., via a data payload of a MsgA).

In some examples, UE 115-*a* may represent a low complexity UE 115 (e.g., a NR-Light UE). In such examples, low complexity UE 115-*a* may be configured to transmit with a reduced transmit power compared to other non-low complexity devices (e.g., compared to other UEs 115, such as an enhanced mobile broadband (eMBB) UE, that may operate in same cell as the low complexity UE 115-*a*). For instance, the uplink transmit power of a low complexity UE 115-*a* may have a transmission power capability of, for example, 10 dBs less than that of a other UE 115 (e.g., an eMBB UE). In some cases, UE 115-*a* may be equipped with a reduced number of transmit/receive (Tx/Rx) antennas. For example, UE 115-*a* may be equipped with reduced Tx antennas (e.g., a single Tx antenna), reduced Tx/Rx bandwidth (e.g., 5 MHz-20 MHz bandwidth for both Tx and Rx), reduced Rx antennas (e.g., a single Rx antenna, which may result in a lower equivalent receive SNR for a given signal compared to UEs equipped with increased number of Rx antennas), and reduced computational complexity. In some cases, such a low complexity UE 115-*a* may be designed with such low complexity to maintain some intended benefit (e.g., such as reduced power consumption, reduced cost due to reduced Rx and/or Tx antenna equipment, reduced computational complexity, etc.).

As such, according to the techniques described herein, wireless communications system 200 may support repetitions in downlink (e.g., RAR repetitions 210) to compensate for reduced number of Rx antennas (e.g., RAR repetitions 210 may compensate for lower equivalent SNR due to, for example, a UE 115-*a* equipped with a single Rx antenna, as such a UE 115-*a* may coherently combine instances of RAR repetitions 210). In some cases, wireless communications system 200 may support uplink repetitions to compensate for reduced number of Tx antennas (e.g., uplink repetitions, for example of random access request 205, may recover some of the loss of reduced Tx antennas and limited Tx power of UE 115-*a*).

A four step (e.g., 4-step) random access procedure (e.g., a 4-step PRACH) may include a Message 1 (e.g., a random access request 205, which may be referred to as a RACH preamble, a PRACH preamble, a Msg1, etc.) from UE 115-*a* to base station 105-*a*. For example, Message 1 (e.g., a random access request 205) may include or refer to a Zadoff-Chu sequence based preamble that may indicate the presence of a random access attempt and allow base station 105-*a* to estimate the delay between the base station 105-*a* and the UE 115-*a*. The four step random access procedure may also include a Message 2 (e.g., a RAR in response to the random access request 205) from base station 105-*a* to UE 115-*a*. For example, in response to the detected preamble, the network may transmit a message (e.g., base station 105-*a* may transmit a RAR) on the downlink shared channel (e.g., PDSCH) including an index of the detected preamble index (e.g., an index of the detected random access request 205 preamble), an uplink timing correction for the UE 115-*a*, a scheduling grant indicating what resources the UE 115-*a* should use for transmission of the Message 3 (Msg3), a temporary cell radio network temporary identifier (TC-RNTI) (e.g., used for further communication between the UE 115-*a* and the network), etc. The response message (e.g., the RAR) may be scheduled on the downlink shared channel and indicated on a PDCCH using an identity (e.g., RA-RNTI) which may be given by the time and frequency resource upon which the random access request 205 (e.g., the random access preamble) was transmitted. In some cases, a minimum unit (e.g., a minimum resource unit) of PDCCH may be referred to as a CCE, and an AL may indicate how many CCEs may form the PDCCH.

The four step random access procedure may also include a Message 3 (e.g., which may be referred to as a device identification message, a Msg 3, a RRC Connection Request, etc.) from the UE 115-*a* to the base station 105-*a*. The UE 115-*a* may transmit the Msg3 including at least a UE-ID to the base station 105-*a* using uplink shared resources (e.g., PUSCH) assigned in the second step (e.g., assigned by Msg2 from the base station 105-*a*). Device specific scrambling may be used for the transmission of Msg3 (e.g., scrambling specific to UE 115-*a* based on the TC-RNTI assigned in the Msg2). If the UE 115-*a* is in the RRC connected state thus having a cell radio network temporary identifier (C-RNTI) assigned, then the C-RNTI may be used as the UE-ID. Otherwise a core-network device identifier, such as a 40-bit Serving-Temporary Mobile Subscriber Identity (S-TMSI) may be used as the UE-ID.

The four step random access procedure may also include a Message 4 (e.g., which may be referred to as Msg4, a contention resolution message, a RRC Connection Setup message, etc.) from base station 105-*a* to UE 115-*a*. This last step may include a downlink message (e.g., Msg4) for contention resolution since there may be a certain probability of contention in the third step (e.g., in Msg3). That is, if multiple devices use the same random access preamble at the same time, then multiple devices may react upon the same random access response such that a collision may occur. If the UE 115-*a* already had a C-RNTI assigned, contention solution may be handled by addressing the UE 115-*a* on the PDCCH using the C-RNTI. If the UE 115-*a* does not have a valid C-RNTI (e.g., in the idle state before), the contention resolution message may be addressed using the TC-RNTI and the UE 115-*a* may compare the UE-ID received within PDSCH scheduled by the above PDCCH, with the UE-ID transmitted in the Msg3, and declare the random access as successful after observing a match and then promote TC-RNTI to C-RNTI.

In some cases, wireless communications system 200 may support UE indication of Msg3 repetition level (e.g., uplink repetition level for Msg3 of four step random access procedures) in Msg1. Multiple groups of ROs associated with different types of preamble formats may be configured to UE 115-*a* (e.g., via a system information block (SIB), such as SIB1), where each group of ROs are also associated with a reference signal received power (RSRP) threshold in the configuration. For each group of ROs, multiple groups of preamble sequences may be further configured, wherein each group of preamble sequences may be associated with a Msg3 repetition level. UE 115-*a* may choose the appropriate ROs and preamble format according to its RSRP, and then UE 115-*a* may choose a preamble sequence associated with the chosen groups of ROs according to its Msg3 repetition level preference.

According to such UE 115-*a* indication of Msg3 repetition level (e.g., via Msg1 preamble sequence selection), base station 105-*a* may distinguish different UEs 115 according to their RSRP and Msg3 repetition level preference. Further, base station 105-*a* may schedule different UE's Msg3 transmissions based on their repetition level preference using Msg2 (e.g., using RAR). However, repetitions of PDCCH and PDSCH in Msg2 may also be employed, for example, to compensate reduced number of Rx antennas. As such, the techniques described herein may provide for details of how such RAR repetitions 210 may be configured by the base station 105-*a* and received by UE 115-*a* (e.g., for PDCCH/PDSCH repetition for Msg2).

In some examples, base station 105-*a* may configure Msg2 repetitions (e.g., base station 105-*a* may configure RAR repetitions 210 via SIB1, via remaining minimum system information (RMSI), etc.). SIB1 may configure multiple groups of ROs, wherein each group of ROs are associated with a certain preamble format. For each group of RO, base station 105-*a* may configure (e.g., via SIB1, RMSI, etc.) multiple groups of preamble sequences, where each group of preamble sequences are associated with a certain downlink repetition level preference. For example, each RO may be associated with a preamble format for transmitting Msg1, and each RO or each preamble format may further be associated with multiple preamble sequences (e.g., where each preamble sequence may be associated with a repetition level for Msg3). In some examples, each group of preamble sequences may also be associated with a unique uplink repetition level.

For each downlink repetition level preference among multiple preferences, base station 105-*a* may configure (e.g., via SIB1, RMSI, etc.) repetition-level-specific parameters including a RA-RNTI, a CORESET, a SS, a number of SS repetitions (e.g., a higher repetition-level may be associated with a greater number of SS repetitions, a SS Repetition Pattern (e.g., Inter-slot repetition, intra-slot repetition), CCE AL candidates (e.g., such AL configuration may lower UE 115-*a* blind detection/combining complexity across multiple SS repetitions), a RAR window length (e.g., which may be associated with the downlink repetition level), or some combination thereof. In some cases, base station 105-*a* may configure (e.g., via SIB1, RMSI, etc.) additional repetition-level-specific parameters. In some cases, such RAR window length configuration may further reduce some UEs' (e.g., UE 115-*a*) detection power consumption (e.g., a lower repetition level may be associated with a shorter RAR window length, such that the UE may consume less power monitoring for RAR across a shorter RAR window length).

As such, UE 115-*a* may determine its downlink repetition level preference (e.g., based on channel measurements, a capability of the UE, hardware of the UE, etc.). For example, UE 115-*a* may determine a downlink repetition level preference based on measurements (e.g., RSRP measurement, reference signal received quality (RSRQ) measurement, layer 1-signal-to-interference-plus-noise ratio (L1-SINR), etc.) of one or more reference signals transmitted by base station 105-*a*. Additionally or alternatively, UE 115-*a* may determine a downlink repetition level preference based on UE capabilities or UE hardware (e.g., such as a number of Rx antennas, power consumption constraints, etc.). For example, a higher repetition level (e.g., an increased number of RAR repetitions 210) may generally be selected or determined for poor/adverse reference signal measurements. As another example, a higher repetition level (e.g., an increased number of RAR repetitions 210) may generally be selected or determined for lower number of Rx antennas at UE 115-*a*. Further, a lower repetition level (e.g., less RAR repetitions 210) may be selected or determined for higher numbers of Rx antennas at a UE (e.g., which may reduce power consumption at such a UE, as less RAR repetitions 210 may be associated with a shorter RAR window length). In some cases, reduced power capabilities of a UE or a low battery status may result in selection or determination of a lower repetition level.

The downlink repetition level preference may or may not be the same as an uplink repetition level preference (e.g., a preamble sequence group may be associated with a single repetition level for both Msg2 downlink and Msg3 uplink, or a preamble sequence group may be associated with a first repetition level for Msg2 downlink and a second repetition level Msg3 uplink).

As described in more detail herein (e.g., with reference to, for example, FIG. 3), a UE may first choose a group of ROs, from the multiple groups of ROs associated with different preamble formats, based on its RSRP, its RSRQ, its L1-SINR, its number of Tx antennas, etc. Then the UE may further choose a group of preamble sequences, from the multiple groups of preamble sequences associated with different downlink repetition level preferences, based on the UE's DL repetition level preference. For example, when equipped with more Rx antennas, a UE may choose (e.g., select, determine, etc.) a preamble associated with fewer downlink repetition levels, and vice versa. The UE 115-*a* may transmit the preamble sequence (e.g., the random access request 205) based on its RO group/preamble group selection. Further, UE 115-*a* may receive Msg2 (e.g., RAR repetitions 210) based on the selected RO group/preamble group, as well as based on the configuration from the base station 105-*a* (e.g., the SIB1 configurations in SIB1).

A two step random access procedure (e.g., a two step RACH procedure) may include a RACH message A (e.g., a random access request 205, which may be referred to as a RACH preamble, a PRACH preamble, a MsgA, etc.) from UE 115-*a* to base station 105-*a*. Further, a two step random access procedure may include a RACH message B (e.g., a RAR, MsgB, etc. in response to the random access request 205). In some cases, wireless communications system 200 may employ certain adjustments for two step random access procedures. For example, if two step RACH is used instead of four step RACH, base station 105-*a* configurations (e.g., SIB1 configurations) may not necessarily divide the preamble sequences into multiple groups for different downlink repetition level preferences (e.g., different RACH occasions/PUSCH occasions (RO/POs) in two step RACH may already convey different PUSCH transmission schemes including repetitions, thus PUSCH repetitions may not need separate preamble grouping either.

Further, since a PUSCH (e.g., a data payload) may be included in MsgA for two step RACH, the UE may report its downlink repetition level preference in the PUSCH, using RRC or MAC-CE or UCI. Further, for two step RACH, the UE may monitor MsgB (e.g., RAR repetitions 210) based on its reported downlink repetition level preference as well as the base station 105-*a* (e.g., SIB1) configurations. In scenarios where base station 105-*a* only detects the preamble (e.g., but could not decode the PUSCH), base station 105-*a* may send a fallback RAR using the maximum downlink repetition level configuration associated with the detected RO/PO. In some cases, the base station 105-*a* may not send RAR in such scenarios. The fallback RAR may contain a PUSCH retransmission uplink grant or a four step RACH fallback command. In other words, in cases where base station 105-*a* is unable to detect or decode an explicit repetition level indication in MsgA, the base station 105-*a* may default to some configured (e.g., some preconfigured) maximum repetition level for RAR repetitions 210.

Figure 3:
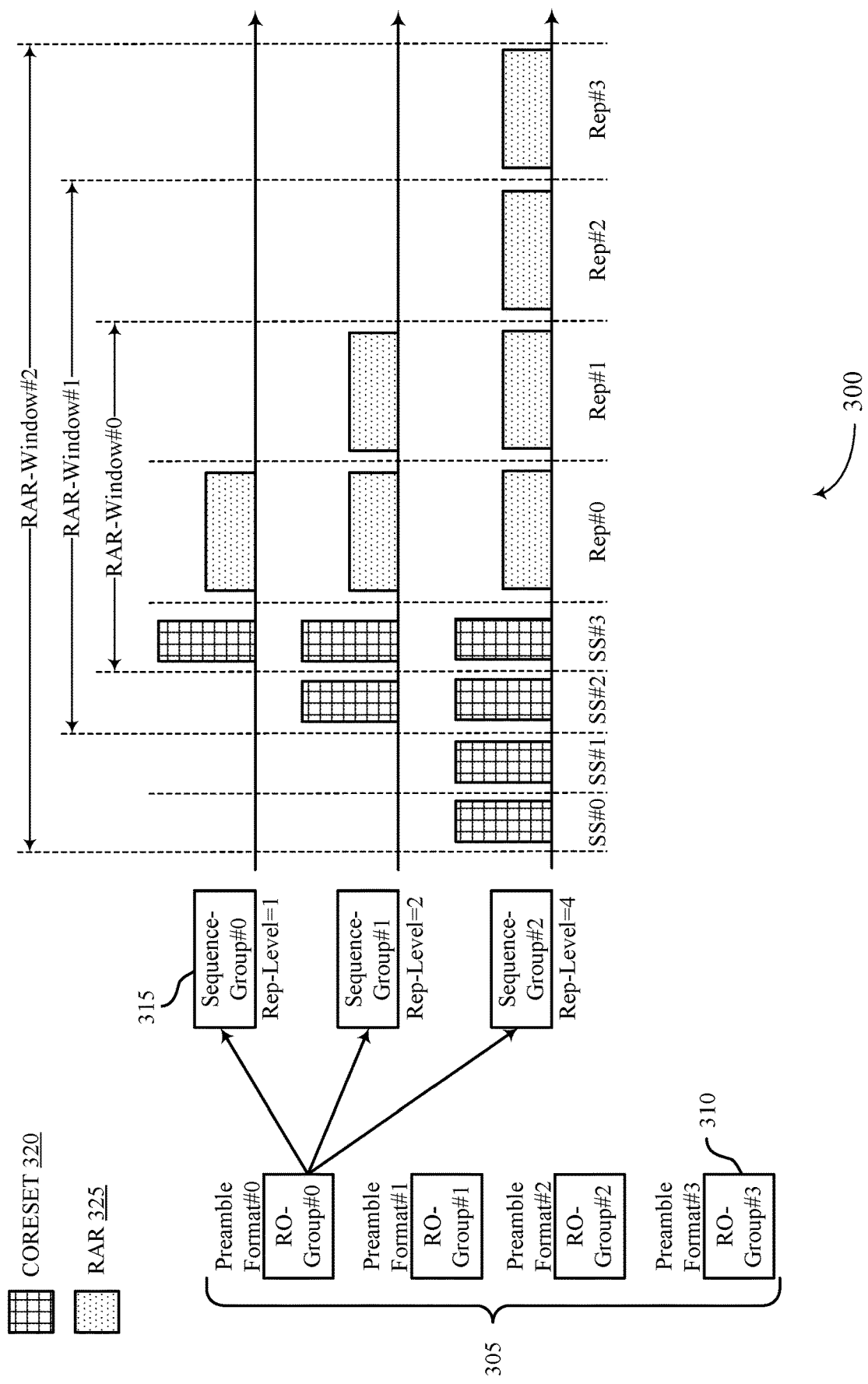
FIG. 3 illustrates an example of a random access channel (RACH) occasion (RO) configuration diagram that supports NR-Light RAR repetition in accordance with aspects of the present disclosure.

FIG. 3 illustrates an example of a RO configuration diagram 300 that supports NR-Light RAR repetition in accordance with aspects of the present disclosure. In some examples, RO configuration diagram 300 may implement aspects of wireless communications system 100 and/or wireless communications system 200. RO configuration diagram 300 may illustrate ROs 305 that may be divided (e.g., configured) into one or more RO groups 310 (e.g., such as RO-Group #0, RO-Group #1, RO-Group #2, and RO-Group #3). Further, according to aspects of the techniques described herein, each RO group 310 may be divided (e.g., configured) into one or more preamble sequence groups 315 (e.g., RO-Group #0 may be associated or configured with Sequence-Group #0, Sequence-Group #1, and Sequence-Group #3). As discussed herein, each preamble sequence group 315 may correspond or be configured with a repetition level (Rep-Level). For example, Sequence-Group #0 may be associated with a Rep-Level=1, Sequence-Group #1 may be associated with a Rep-Level=2, and Sequence-Group #3 may be associated with a Rep-Level=4).

A RO 305 (e.g., which may be referred to as a random access occasion, a RACH opportunity, etc.) may include an area specified in time and frequency domain that are available for the reception of RACH preamble by a base station 105 (e.g., area specified in time and frequency domain that are available for the transmission of RACH preamble by a UE 115). In some examples, a base station 105 may send a synchronization signal block (SSB) is associated with different beams, and a UE 115 may select a certain beam and send PRACH using that beam. In order for a network to figure out which beam a UE 115 has selected, the network may configure a mapping between SSB and RO 305. By detecting which RO 305 the UE 115 sends a preamble sequence with, the network may figure out which SSB beam that UE 115 has selected. In some cases, a configuration (e.g., a configuration of a set of RO groups 310 and a set of preamble sequence groups 315 associated with each RO group 310) may configure (e.g., or divide) one or more ROs 305 into RO groups 310 based on, for example, a preamble format associated with the ROs (e.g., such that each RO group 310 is associated with a different preamble format). In some cases, a configuration may configure (e.g., or divide) one or more ROs 305 into RO groups 310 based on, for example, time domain resources associated with the ROs 305 (e.g., such that each RO 305 in an RO group 310 may be associated with a same location in the time domain but with different frequency domain resources).

Each RO group 310 may have its own preamble format, and a UE 115 may identify or select a RO group 310 based on signal measurements, such as reference signal (RS) measurements, SSB measurements, etc. For example, RO-Group #0 may have a Preamble-Format #0 for some RSRP #0, RO-Group #1 may have a Preamble-Format #1 for some RSRP #1, RO-Group #2 may have a Preamble-Format #2 for some RSRP #2, and RO-Group #3 may have a Preamble-Format #3 for some RSRP #3). Different preamble formats may have different preamble sequences, different subcarrier spacing (SCS), different durations, etc. As such, different preamble formats may have different strength (e.g., success rate or robustness) for random access request (e.g., preamble) transmissions to a base station (e.g., such that different Preamble-Format may be selected for different RSRP).

Aspects of FIG. 3 may illustrate that for shorter repetition levels, RAR window length may be reduced (e.g., which may result in reduced power consumption at a UE monitoring the RAR window). For example, a RAR-Window #0 associated with Sequence-Group #0 (e.g., a preamble sequence group 315 associated with a Rep-Level=1 or one RAR repetition in Rep #0) may be shorter than a RAR-Window #2 associated with Sequence-Group #2 (e.g., a preamble sequence group 315 associated with a Rep-Level=4 or four RAR repetitions in Rep #0, Rep #1, Rep #2, and Rep #3). However, as discussed herein, increased RAR repetitions may improve the likelihood the RAR is successfully received at a UE 115 (e.g., at a low-complexity UE 115).

In some cases, repetition level correspondence to preamble sequence groups 315 may be RRC configured. In some cases, each preamble sequence group 315 may have its own RA-RNTI. For a selected RO group 310, a UE 115 may choose a preamble sequence group 315 to use to select a preamble sequence for transmission based on the repetition level corresponding to the preamble sequence group 315. In some cases, Msg2 PDCCH with DCI (e.g., CORESETs 320) may schedule RAR 325 payload in PDSCH.

Figure 4:
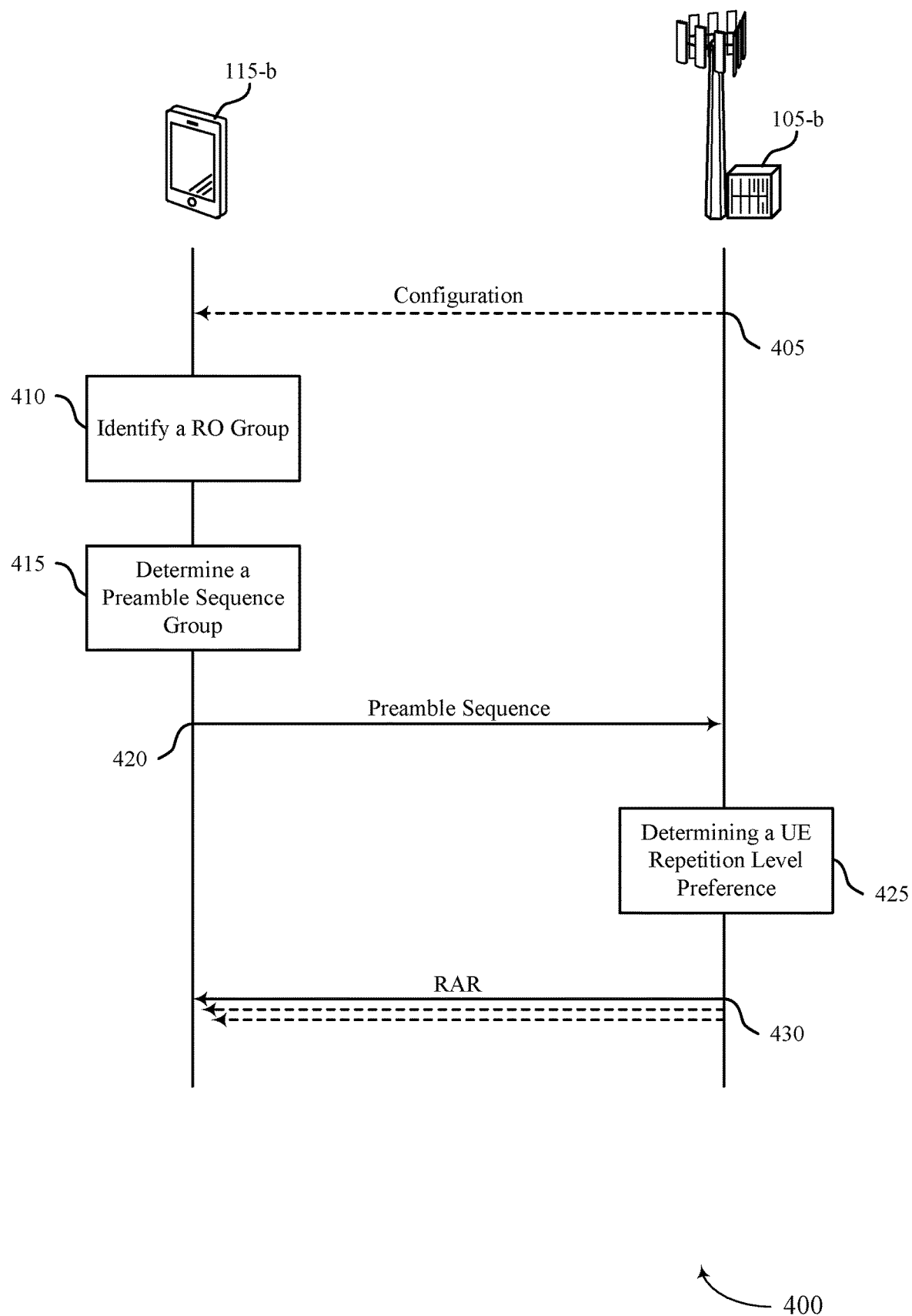
FIG. 4 illustrates an example of a process flow that supports NR-Light RAR repetition in accordance with aspects of the present disclosure.

FIG. 4 illustrates an example of a process flow 400 that supports NR-Light RAR repetition in accordance with aspects of the present disclosure. In some examples, process flow 400 may implement aspects of wireless communications system 100, wireless communications system 200, and/or RO configuration diagram 300. For example, process flow 400 may include a base station 105-b and UE 115-b, which may be examples of the corresponding devices described with reference to FIGS. 1-3. UE 115-b may generally include or refer to any UE such as an eMBB UE, a premium UE, a low complexity UE, a Light device, a NR-Light device, a low tier device, an IoT device, a smart device, a sensor, a camera, a wearable device, etc. The process flow 400 includes functions and communications implemented by base station 105-b and UE 115-b in the context of random access channel procedures with RAR repetition (e.g., for more efficient random access configuration/procedures).

In the following description of the process flow 400, the operations between by base station 105-b and UE 115-b may be transmitted in a different order than the order shown, or the operations may be performed in different orders or at different times. Certain operations may also be left out of the process flow 400, or other operations may be added to the process flow 400. It is to be understood that while by base station 105-b and UE 115-b are shown performing a number of the operations of process flow 400, any wireless device may perform the operations shown.

At 405, in some cases, UE 115-b may receive a configuration of a set of groups of ROs and a set of preamble sequence groups associated with each RO group. For example, the configuration may include a set of RO groups, where each RO group may further be associated with a set of preamble sequence groups (e.g., where each preamble sequence group of the set of preamble sequence groups is associated with a different repetition level).

In other words, the configuration may divide preamble sequences into multiple groups, where each preamble sequence group may be associated with a repetition level for at least one downlink message associated with the RACH procedure (e.g., a repetition level for RAR). As such, each preamble sequence group may include one or more preamble sequences that UE 115-b may use to indicate a repetition level preference. In some cases (e.g., at 405), the configuration may be signaled to the UE 115-b from base station 105-b. In some examples, the configuration may be preconfigured by the network (e.g., such that the UE 115-*b* may identify or retrieve the configuration via a look-up table (LUT)).

For example, as discussed herein, the configuration may include repetition level parameters for each preamble sequence of the set of preamble sequence groups associated with each RO group. Such repetition level parameters may include a RA-RNTI, a CORESET, a SS, a number of SS repetitions, a SS repetition pattern, a CCE AL candidate, a RAR window length, or some combination thereof. In some cases, the configuration may be received in RMSI, SIB1, etc.

At 410, UE 115-*b* may identify a RO group over which to transmit a preamble associated with a RACH procedure (e.g., based on the configuration, which may be preconfigured, may be received at 405, etc.). For example, in some cases, the UE 115-*b* may identify the RO group based on a preamble format associated with the RO group. In some examples, UE 115-*b* may identify a RO group based on a beam selected (e.g., based on a SSB transmitted by base station 105-*b*). In some examples, UE 115-*b* may identify a RO group based on time domain resources associated with the RO group, based on frequency domain resources associated with the RO group, based on preamble sequence groups associated with the RO group (e.g., based on a repetition level preference of the UE 115-*b* and corresponding preamble sequence groups), etc.

In some cases, UE 115-*b* may perform one or more signal reception quality measurements (e.g., RSRP, RSRQ, SINR, etc.) associated with a downlink signal (e.g., associated with downlink RSs from base station 105-*b*, associated with one or more SSB from base station 105-*b*, etc.) on a downlink channel, and UE 115-*b* may selecting the RO group from a set of groups of ROs based on the one or more signal reception quality measurements (e.g., where the RO group may be identified at 410 based on the selecting). In some examples, the RO group may be identified based on a transmission capability of UE 115-*b* (e.g., based on a number of Tx antennas of the UE 115-*b*).

At 415, UE 115-*b* may determine a preamble sequence group associated with the identified RO group based on a repetition level associated with the preamble sequence group. For example, in some cases, UE 115-*b* may perform one or more signal reception quality measurements (e.g., RSRP, RSRQ, SINR, etc.) associated with a downlink signal (e.g., associated with downlink RSs from base station 105-*b*) on a downlink channel, where the preamble sequence group may be determined based on the one or more signal reception quality measurements. In some examples, UE 115-*b* may identify a reception capability (e.g., a number of Rx antennas, a computational capability related to receiving signals, etc.), where the preamble sequence group may be determined based on the reception capability. In other words, the preamble sequence group may be determined based on a corresponding repetition level preference (e.g., set by the configuration), where the repetition level preference may be identified or determined based on RSRP measurement, RSRQ measurement, SINR measurement, UE 115-*b* reception capability, a number of Rx antennas of UE 115-*b*, etc.

At 420, UE 115-*b* may transmit a preamble sequence to base station 105-*b*, where the preamble sequence may be based on the determined preamble sequence group, transmitted based on the RO group, etc.

At 425, base station 105-*b* may determine a repetition level preference (e.g., a UE 115-*b* repetition level preference) for a downlink message associated with the RACH procedure (e.g., for a RAR) based on the received first message (e.g., based on the preamble sequence received at 420 and the configuration).

At 430, base station 105-*b* may transmit the downlink message (e.g., the RAR) based on the received first message (e.g., based on the preamble sequence received at 420) and the determined repetition level preference. For example, in cases where the preamble sequence is associated with a preamble sequence group configured with a repetition level 3, the base station 105-*b* may transmit RAR with 3 repetitions.

Figure 5:
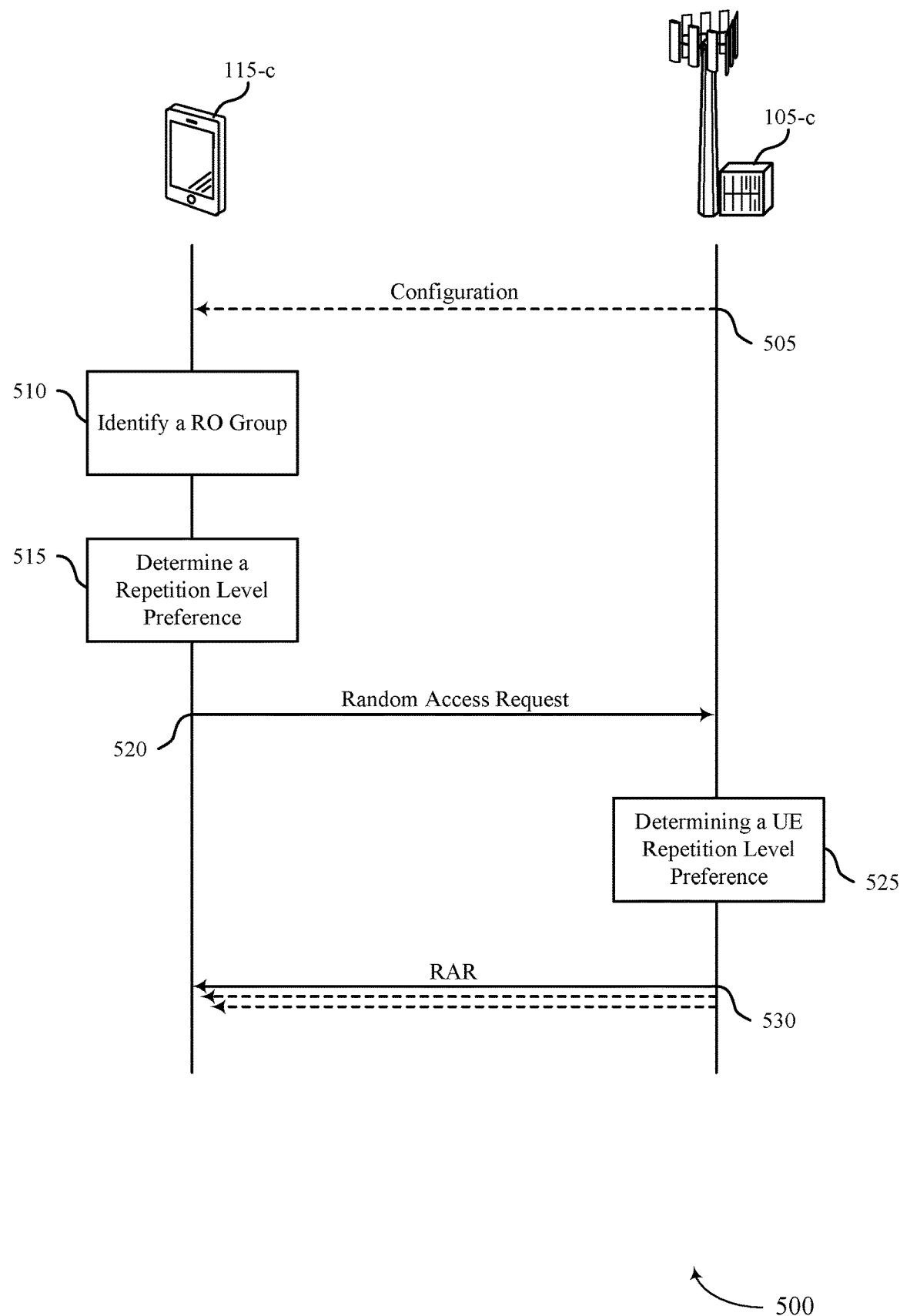
FIG. 5 illustrates an example of a process flow that supports NR-Light RAR repetition in accordance with aspects of the present disclosure.

FIG. 5 illustrates an example of a process flow 500 that supports NR-Light RAR repetition in accordance with aspects of the present disclosure. In some examples, process flow 500 may implement aspects of wireless communications system 100, wireless communications system 200, and/or RO configuration diagram 300. For example, process flow 500 may include a base station 105-*c* and UE 115-*c*, which may be examples of the corresponding devices described with reference to FIGS. 1-4. UE 115-*c* may generally include or refer to any UE such as an eMBB UE, a premium UE, a low complexity UE, a Light device, a NR-Light device, a low tier device, an IoT device, a smart device, a sensor, a camera, a wearable device, etc. The process flow 500 includes functions and communications implemented by base station 105-*c* and UE 115-*c* in the context of random access channel procedures with RAR repetition (e.g., for more efficient random access configuration/procedures).

In the following description of the process flow 500, the operations between by base station 105-*c* and UE 115-*c* may be transmitted in a different order than the order shown, or the operations may be performed in different orders or at different times. Certain operations may also be left out of the process flow 500, or other operations may be added to the process flow 500. It is to be understood that while by base station 105-*c* and UE 115-*c* are shown performing a number of the operations of process flow 500, any wireless device may perform the operations shown.

At 505, in some cases, UE 115-*c* may receive a configuration of a set of groups of ROs from base station 105-*c*. In some cases (e.g., at 505), the configuration may be signaled to the UE 115-*c* from base station 105-*c*. In some examples, the configuration may be preconfigured by the network (e.g., such that the UE 115-*c* may identify or retrieve the configuration via a LUT). In some cases (e.g., in cases where process flow 500 illustrates one or more aspects of a two step random access procedure), the configuration may not necessarily divide preamble sequences into groups (e.g., as repetition level preference may be explicitly indicated).

At 510, UE 115-*c* may identify a RO group from the set of groups of ROs based on the configuration (e.g., based on the configuration, which may be preconfigured, may be received at 505, etc.). For example, in some cases, the UE 115-*c* may identify the RO group based on a preamble format associated with the RO group. In some examples, UE 115-*c* may identify a RO group based on a beam selected (e.g., based on a SSB transmitted by base station 105-*c*). In some examples, UE 115-*c* may identify a RO group based on time domain resources associated with the RO group, based on frequency domain resources associated with the RO group, etc.

At 515, UE 115-*c* may determine a repetition level preference for a downlink message associated with a RACH procedure (e.g., for a RAR). For example, a repetition level preference may be determined based on RSRP measurement, RSRQ measurement, SINR measurement, UE 115-*c* reception capability, a number of Rx antennas of UE 115-*c*, etc.

At 520, UE 115-*c* may transmit a random access request (e.g., a preamble associated with the RACH procedure and an indication of the repetition level preference) to base station 105-*c*. For example, in some cases, the random access request may include a MsgA of a two step random access procedure (e.g., and the indication of the repetition level preference may be in PUSCH of the MsgA along with the preamble sequence).

At 525, base station 105-*c* may determine a repetition level preference for a downlink message associated with the RACH procedure (e.g., for a RAR) based on the received first message (e.g., based on the indication of the repetition level preference in the random access request).

At 530, base station 105-*c* may transmit the downlink message (e.g., the RAR) based on the received first message (e.g., based on the preamble sequence received at 420) and the determined repetition level preference. For example, in cases where the preamble sequence is associated with a preamble sequence group configured with a repetition level 3, the base station 105-*c* may transmit RAR with 3 repetitions.

Figure 6:
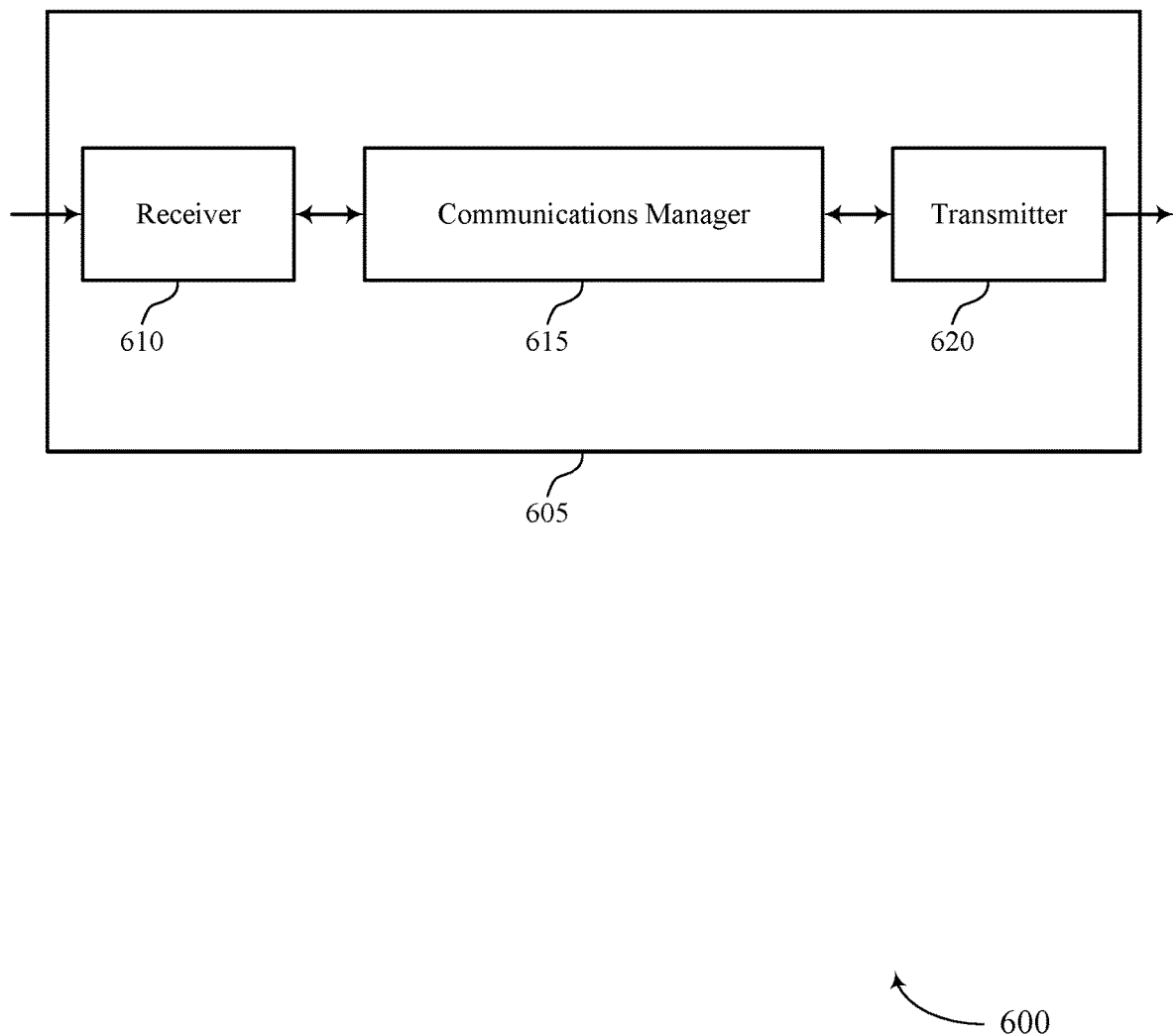
FIGS. 6 and 7 show block diagrams of devices that support NR-Light RAR repetition in accordance with aspects of the present disclosure.

FIG. 6 shows a block diagram 600 of a device 605 that supports NR-Light RAR repetition in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to NR-Light RAR repetition, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may identify a group of random access channel opportunities over which to transmit a preamble associated with a random access channel procedure, determine a preamble sequence group associated with the identified group of random access channel opportunities based on a repetition level associated with the preamble sequence group, and receive at least one downlink message associated with the random access channel procedure based on the repetition level. The communications manager 615 may also determine a repetition level preference for a downlink message associated with a random access channel procedure, transmit a preamble associated with the random access channel procedure and an indication of the repetition level preference, and receive the downlink message based on the preamble and the repetition level preference. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
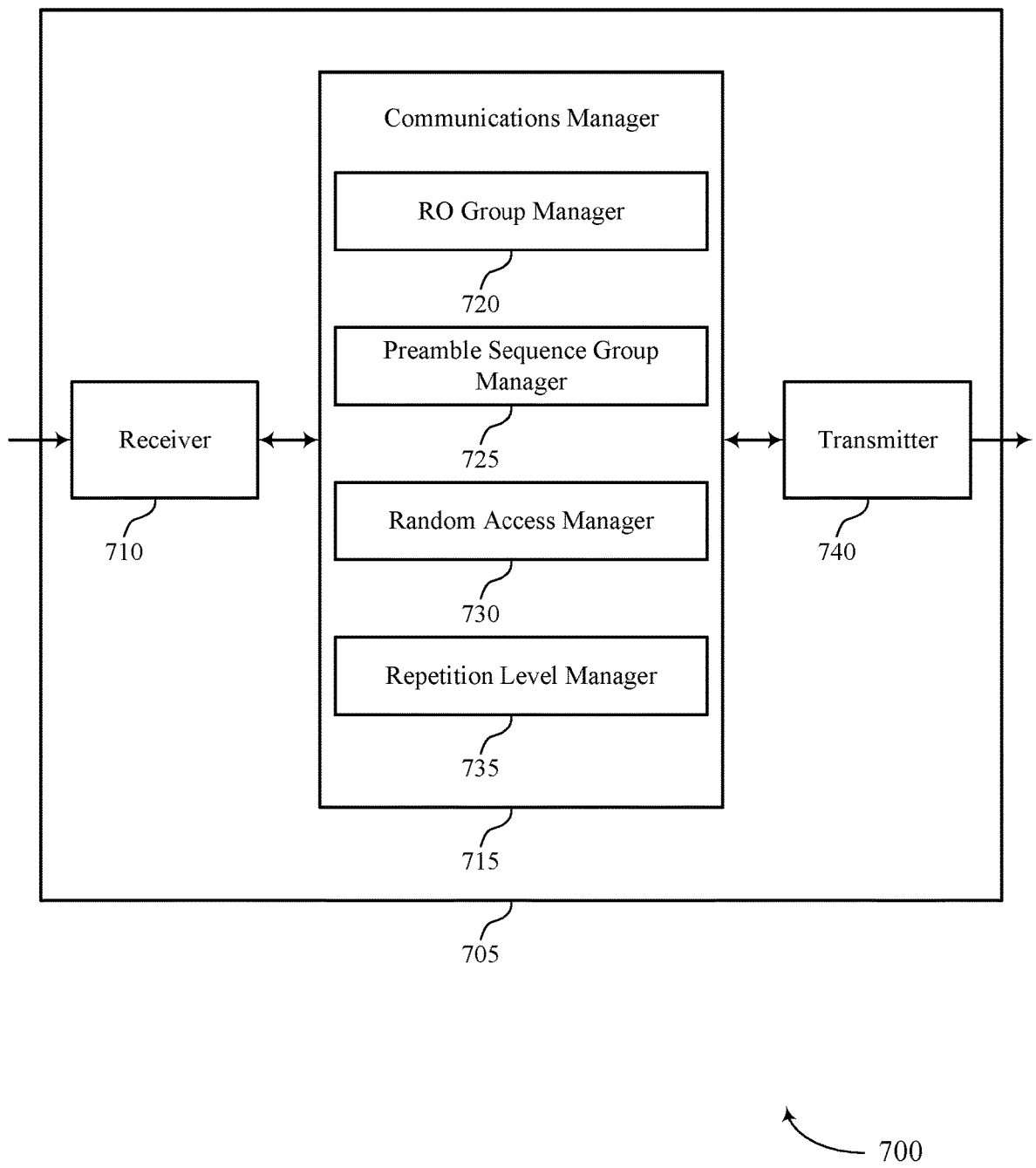

FIG. 7 shows a block diagram 700 of a device 705 that supports NR-Light RAR repetition in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to NR-Light RAR repetition, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a RO group manager 720, a preamble sequence group manager 725, a random access manager 730, and a repetition level manager 735. The communications manager 715 may be an example of aspects of the communications manager 910 described herein.

The RO group manager 720 may identify a group of random access channel opportunities over which to transmit a preamble associated with a random access channel procedure. The preamble sequence group manager 725 may determine a preamble sequence group associated with the identified group of random access channel opportunities based on a repetition level associated with the preamble sequence group. The random access manager 730 may receive at least one downlink message associated with the random access channel procedure based on the repetition level.

The repetition level manager 735 may determine a repetition level preference for a downlink message associated with a random access channel procedure. The random access manager 730 may transmit a preamble associated with the random access channel procedure and an indication of the repetition level preference and receive the downlink message based on the preamble and the repetition level preference.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
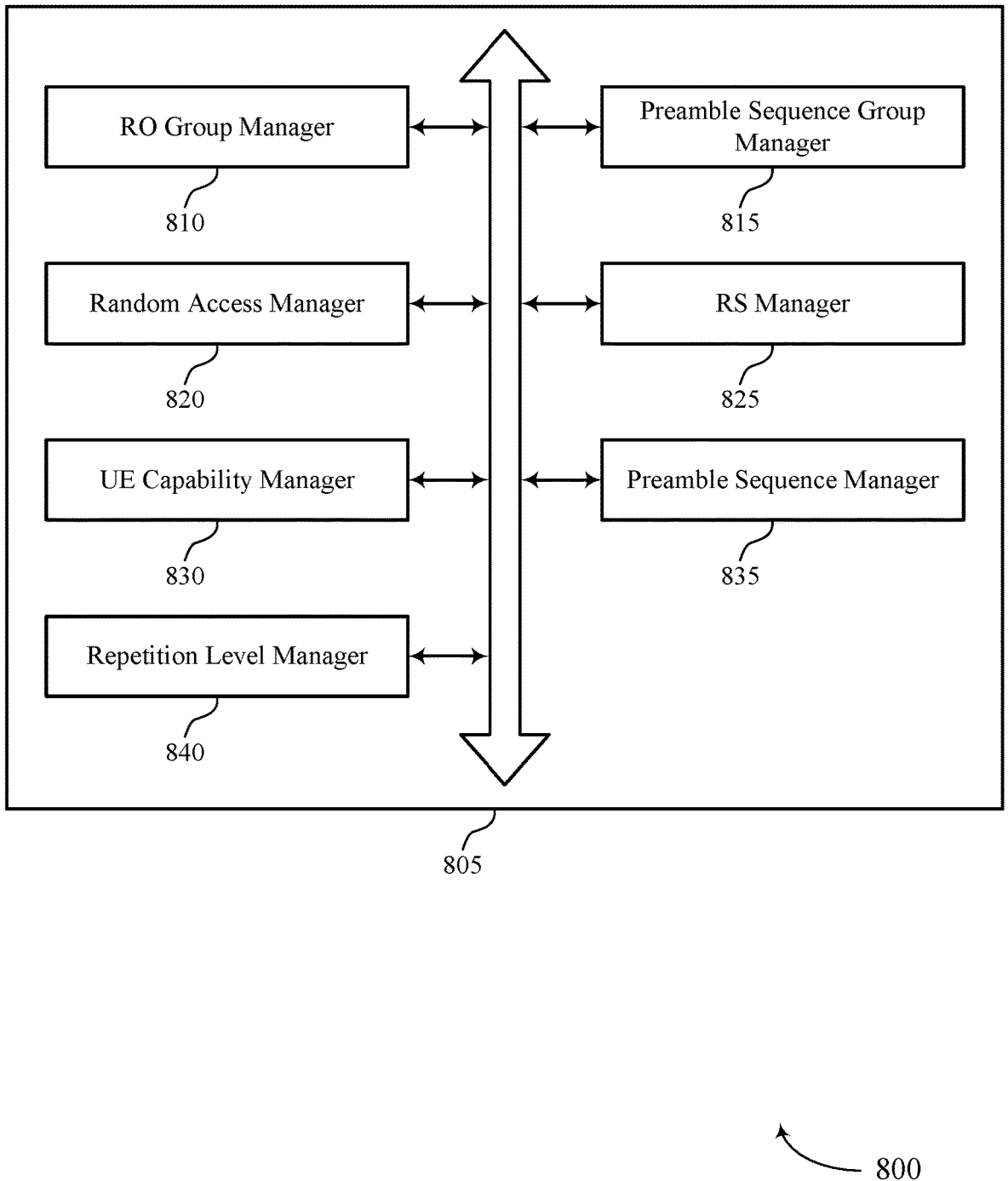
FIG. 8 shows a block diagram of a communications manager that supports NR-Light RAR repetition in accordance with aspects of the present disclosure.

FIG. 8 shows a block diagram 800 of a communications manager 805 that supports NR-Light RAR repetition in accordance with aspects of the present disclosure. The communications manager 805 may be an example of aspects of a communications manager 615, a communications manager 715, or a communications manager 910 described herein. The communications manager 805 may include a RO group manager 810, a preamble sequence group manager 815, a random access manager 820, a RS manager 825, an UE capability manager 830, a preamble sequence manager 835, and a repetition level manager 840. Each of these modules may communicate, directly or indirectly, with one another (e.g., via one or more buses).

The RO group manager 810 may identify a group of random access channel opportunities over which to transmit a preamble associated with a random access channel procedure. In some examples, the RO group manager 810 may receive a configuration of a set of groups of random access channel opportunities and a set of preamble sequence groups associated with each group of random access channel opportunities, where the group of random access channel opportunities is identified based on the received configuration. In some examples, the RO group manager 810 may select the group of random access channel opportunities from a set of groups of random access channel opportunities based on the one or more signal reception quality measurements, where the preamble sequence group is selected from the set of preamble sequence groups associated with the selected group of random access channel opportunities.

In some examples, the RO group manager 810 may select the group of random access channel opportunities from a set of groups of random access channel opportunities based on the transmission capability of the UE, where the preamble sequence group is selected from the set of preamble sequence groups associated with the selected group of random access channel opportunities. In some examples, the RO group manager 810 may receive a configuration of a set of groups of random access channel opportunities. In some examples, the RO group manager 810 may identify a group of random access channel opportunities from the set of groups of random access channel opportunities based on the configuration, where the preamble and the indication are transmitted based on the identified group of random access channel opportunities.

In some cases, the configuration includes repetition level parameters for each preamble sequence of the set of preamble sequence groups associated with each group of random access channel opportunities. In some cases, the repetition level parameters include a random access radio network temporary identifier, a control resource set, a search space, a number of search space repetitions, a search space repetition pattern, a control channel element aggregation level candidate, a random access response window length, or some combination thereof. In some cases, the configuration is received in remaining minimum system information. In some cases, each group of random access channel opportunities of the set of groups of random access channel opportunities are associated with a physical uplink shared channel transmission scheme, where the indication is transmitted based on the physical uplink shared channel transmission scheme corresponding to the identified group of random access channel opportunities. In some cases, the downlink message is received based on the received configuration. In some cases, the configuration is received in remaining minimum system information.

The preamble sequence group manager 815 may determine a preamble sequence group associated with the identified group of random access channel opportunities based on a repetition level associated with the preamble sequence group. In some examples, the preamble sequence group manager 815 may select the preamble sequence group from a set of preamble sequence groups associated with the identified group of random access channel opportunities based on a repetition level preference for the at least one downlink message, where each preamble sequence group of the set of preamble sequence groups is associated with a different repetition level for the at least one downlink message. In some cases, the repetition level preference for the at least one downlink message is different from a second repetition level preference for at least one uplink message associated with the random access channel procedure.

The random access manager 820 may receive at least one downlink message associated with the random access channel procedure based on the repetition level. In some examples, the random access manager 820 may transmit a preamble associated with the random access channel procedure and an indication of the repetition level preference. In some examples, the random access manager 820 may receive the downlink message based on the preamble and the repetition level preference. In some cases, the at least one downlink message is received based on the received configuration and the determined preamble sequence group. In some cases, the at least one downlink message includes a message 2 of a four step random access channel procedure.

In some cases, the indication of the repetition level preference is transmitted in a physical uplink shared channel message. In some cases, the indication of the repetition level preference is transmitted in radio resource control signaling, a medium access control control element, uplink control information, or some combination thereof. In some cases, the downlink message includes a message B of a two step random access control channel procedure.

The repetition level manager 840 may determine a repetition level preference for a downlink message associated with a random access channel procedure. The RS manager 825 may perform one or more signal reception quality measurements associated with a downlink signal on a downlink channel, where the preamble sequence group is determined based on the one or more signal reception quality measurements. In some examples, the RS manager 825 may perform one or more signal reception quality measurements associated with a downlink signal on a downlink channel. The UE capability manager 830 may identify a reception capability of the UE, where the preamble sequence group is determined based on the reception capability. In some examples, the UE capability manager 830 may identify a transmission capability of the UE. The preamble sequence manager 835 may transmit a preamble sequence based on the determined preamble sequence group, where the at least one downlink message is received based on the transmitting.

Figure 9:
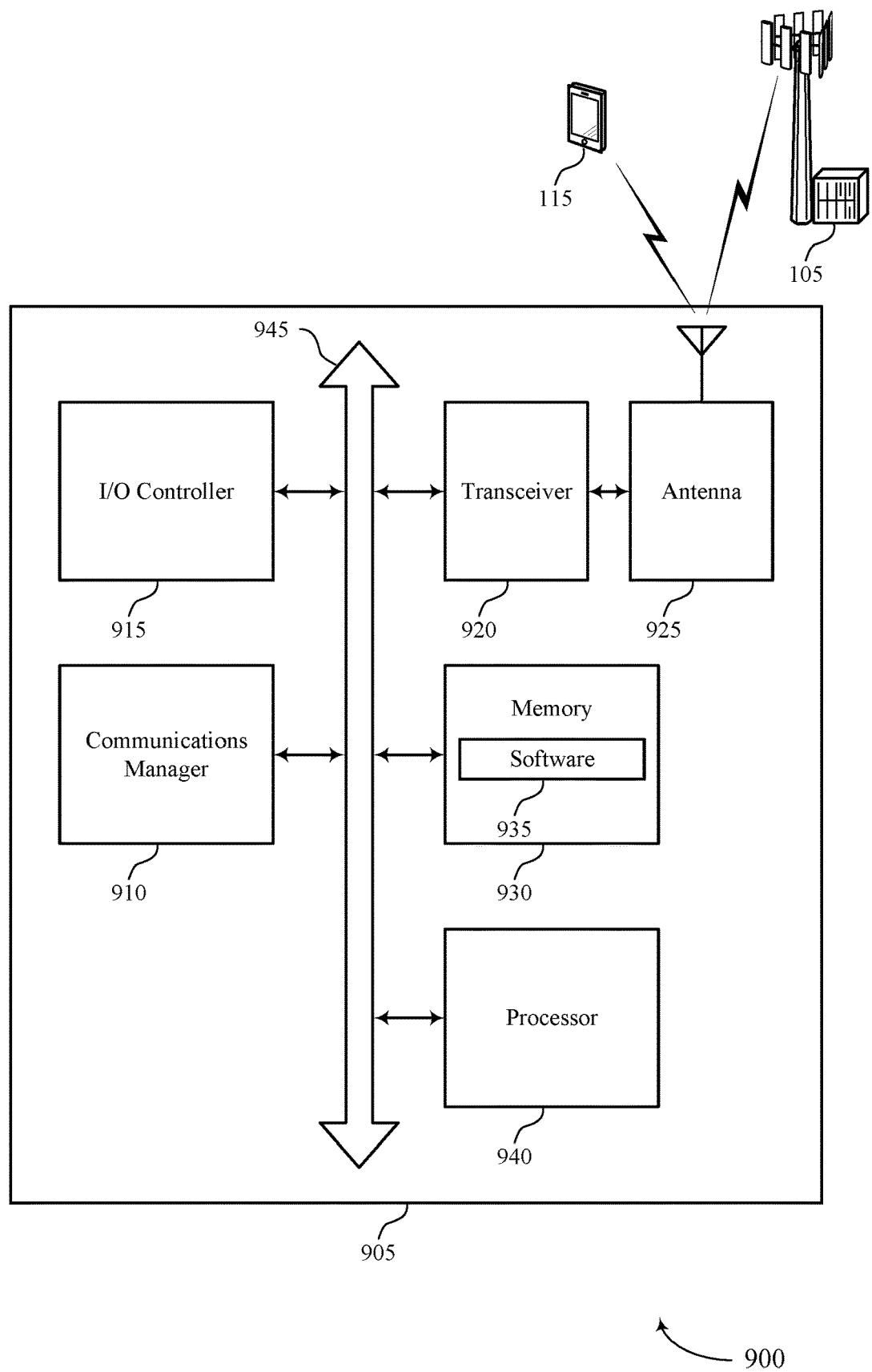
FIG. 9 shows a diagram of a system including a device that supports NR-Light RAR repetition in accordance with aspects of the present disclosure.

FIG. 9 shows a diagram of a system 900 including a device 905 that supports NR-Light RAR repetition in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may identify a group of random access channel opportunities over which to transmit a preamble associated with a random access channel procedure, determine a preamble sequence group associated with the identified group of random access channel opportunities based on a repetition level associated with the preamble sequence group, and receive at least one downlink message associated with the random access channel procedure based on the repetition level. The communications manager 910 may also determine a repetition level preference for a downlink message associated with a random access channel procedure, transmit a preamble associated with the random access channel procedure and an indication of the repetition level preference, and receive the downlink message based on the preamble and the repetition level preference.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code or software 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting NR-Light RAR repetition).

The software 935 may include instructions to implement aspects of the present disclosure, including instructions to support wireless communications. The software 935 may be stored in a non-transitory computer-readable medium such as system memory or other type of memory. In some cases, the software 935 may not be directly executable by the processor 940 but may cause a computer (e.g., when compiled and executed) to perform functions described herein.

Figure 10:
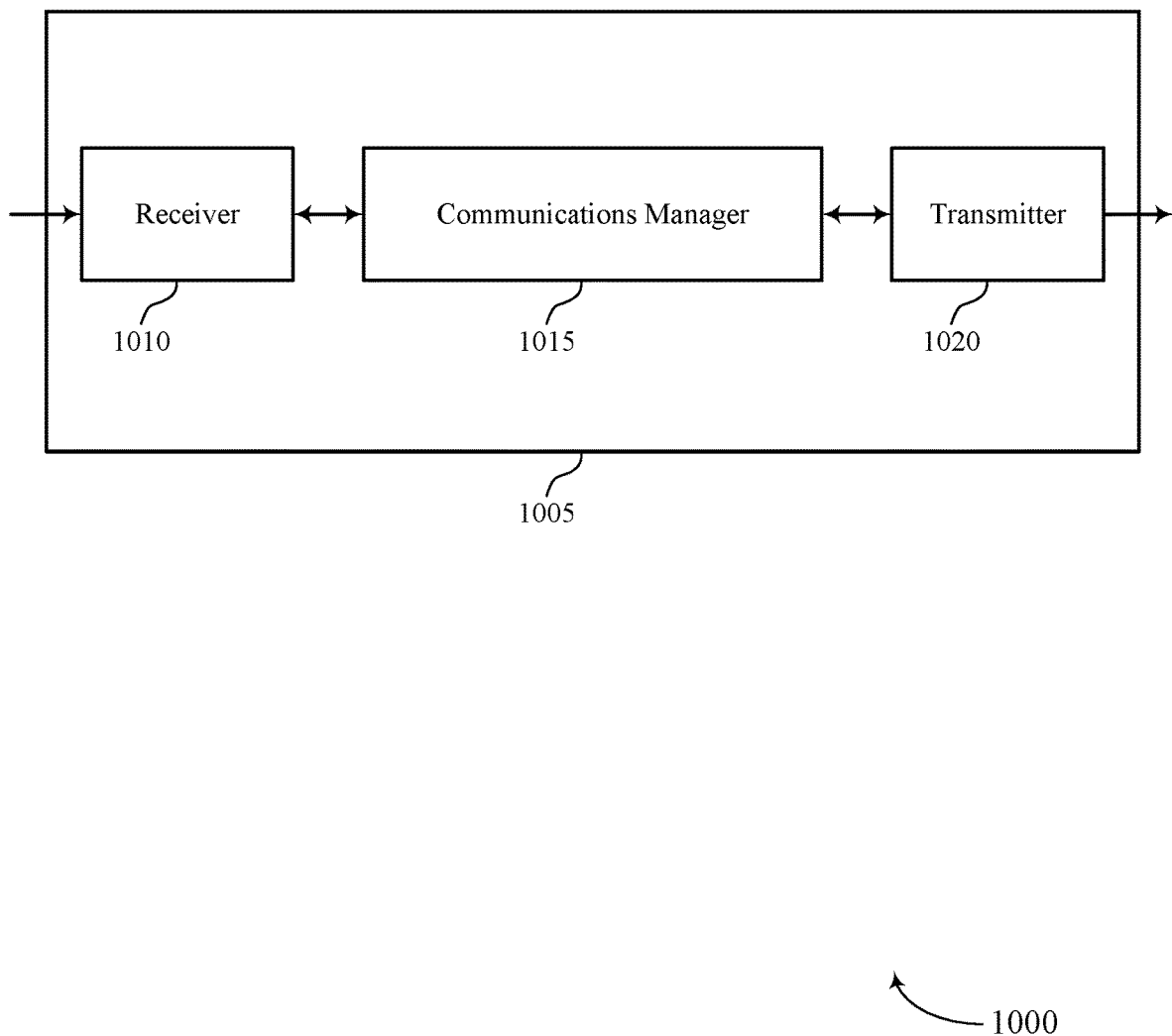
FIGS. 10 and 11 show block diagrams of devices that support NR-Light RAR repetition in accordance with aspects of the present disclosure.

FIG. 10 shows a block diagram 1000 of a device 1005 that supports NR-Light RAR repetition in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to NR-Light RAR repetition, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive a preamble sequence associated with a preamble sequence group of a group of random access channel opportunities, identify a repetition level associated with the preamble sequence group, and transmit at least one downlink message associated with a random access channel procedure based on the received preamble sequence and the identified repetition level. The communications manager 1015 may also receive a first message associated with a random access channel procedure, transmit the downlink message based on the received first message and the determined repetition level preference, and determine a repetition level preference for a downlink message associated with the random access channel procedure based on the received first message. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
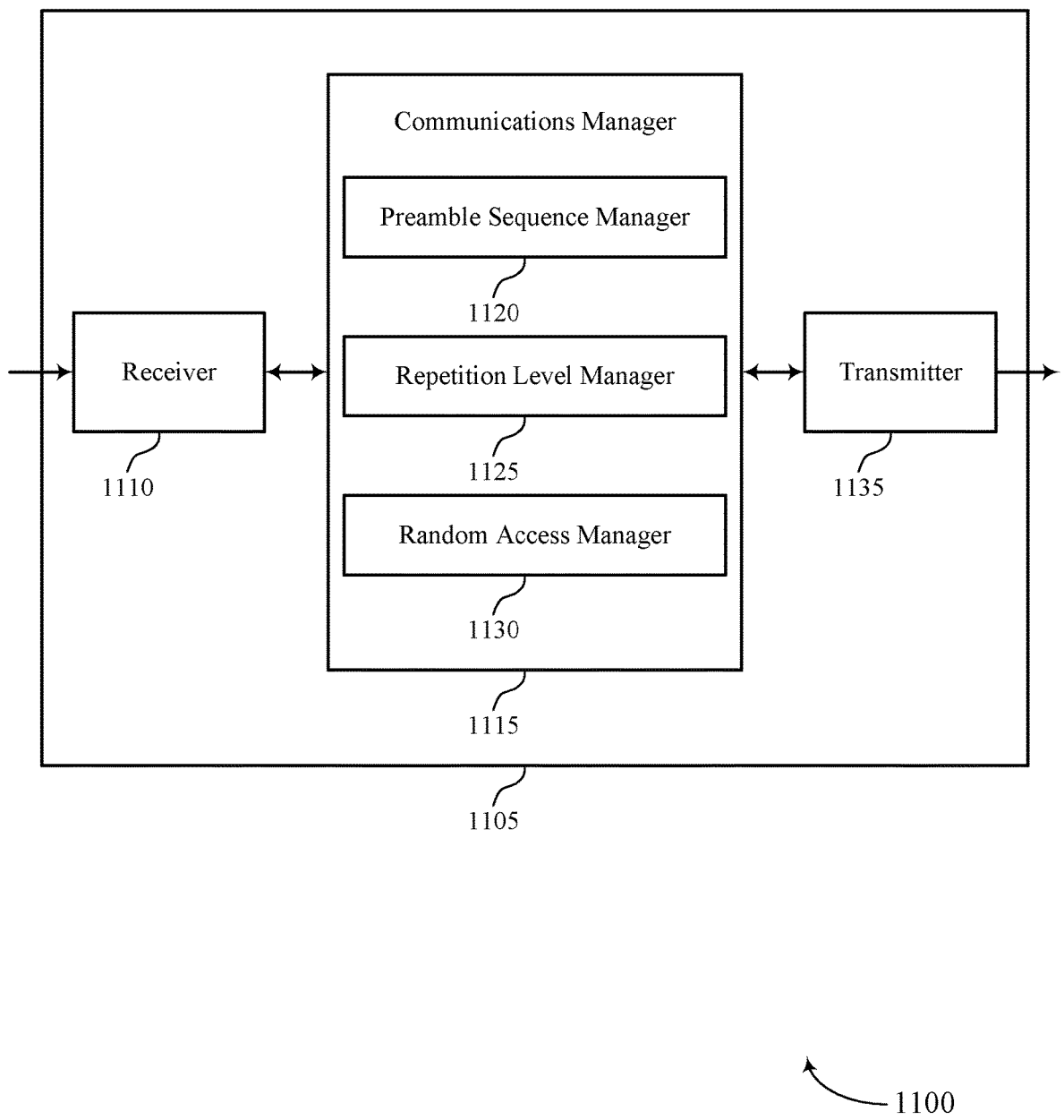

FIG. 11 shows a block diagram 1100 of a device 1105 that supports NR-Light RAR repetition in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to NR-Light RAR repetition, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a preamble sequence manager 1120, a repetition level manager 1125, and a random access manager 1130. The communications manager 1115 may be an example of aspects of the communications manager 1310 described herein.

The preamble sequence manager 1120 may receive a preamble sequence associated with a preamble sequence group of a group of random access channel opportunities. The repetition level manager 1125 may identify a repetition level associated with the preamble sequence group. The random access manager 1130 may transmit at least one downlink message associated with a random access channel procedure based on the received preamble sequence and the identified repetition level.

The random access manager 1130 may receive a first message associated with a random access channel procedure and transmit the downlink message based on the received first message and the determined repetition level preference. The repetition level manager 1125 may determine a repetition level preference for a downlink message associated with the random access channel procedure based on the received first message.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
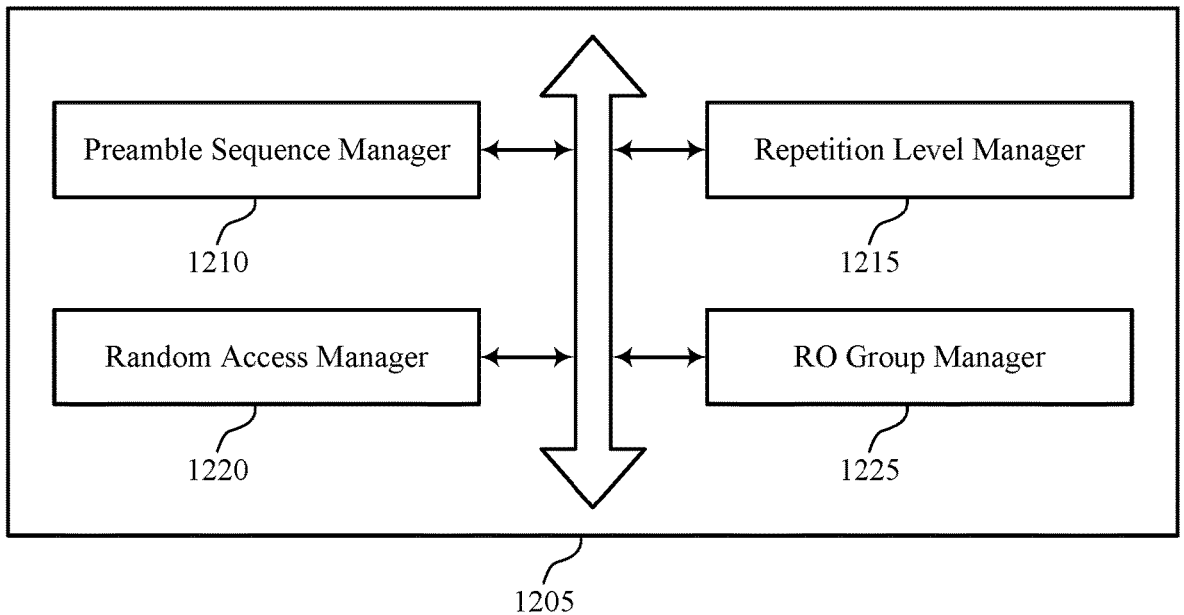
FIG. 12 shows a block diagram of a communications manager that supports NR-Light RAR repetition in accordance with aspects of the present disclosure.

FIG. 12 shows a block diagram 1200 of a communications manager 1205 that supports NR-Light RAR repetition in accordance with aspects of the present disclosure. The communications manager 1205 may be an example of aspects of a communications manager 1015, a communications manager 1115, or a communications manager 1310 described herein. The communications manager 1205 may include a preamble sequence manager 1210, a repetition level manager 1215, a random access manager 1220, and a RO group manager 1225. Each of these modules may communicate, directly or indirectly, with one another (e.g., via one or more buses).

The preamble sequence manager 1210 may receive a preamble sequence associated with a preamble sequence group of a group of random access channel opportunities.

The repetition level manager 1215 may identify a repetition level associated with the preamble sequence group. In some examples, the repetition level manager 1215 may determine a repetition level preference for a downlink message associated with the random access channel procedure based on the received first message. In some examples, identifying a decoding failure associated with the indication of the repetition level preference, where the downlink message includes a fallback random access response message based on the decoding failure. In some cases, the fallback random access response message is transmitted according to a maximum downlink repetition level configuration.

In some cases, the fallback random access response message includes a four step random access channel procedure fall back command or an uplink grant for an uplink shared channel retransmission. In some cases, the indication of the repetition level preference is received in a physical uplink shared channel message. In some cases, the indication of the repetition level preference is received in radio resource control signaling, a medium access control control element, uplink control information, or some combination thereof. The random access manager 1220 may transmit at least one downlink message associated with a random access channel procedure based on the received preamble sequence and the identified repetition level.

In some examples, the random access manager 1220 may receive a first message associated with a random access channel procedure. In some examples, the random access manager 1220 may transmit the downlink message based on the received first message and the determined repetition level preference. In some cases, the at least one downlink message includes a message 2 of a four step random access channel procedure. In some cases, the first message includes a preamble associated with the random access channel procedure and an indication of the repetition level preference. In some cases, the downlink message includes a message B of a two step random access control channel procedure.

The RO group manager 1225 may transmit a configuration of a set of groups of random access channel opportunities and a set of preamble sequence groups associated with each group of random access channel opportunities, where the repetition level associated with the preamble sequence group is identified based on the transmitted configuration. In some examples, the RO group manager 1225 may transmit a configuration of a set of groups of random access channel opportunities, where the first message is received based on the transmitted configuration.

In some cases, the configuration includes repetition level parameters for each preamble sequence of the set of preamble sequence groups associated with each group of random access channel opportunities. In some cases, the repetition level parameters include a random access radio network temporary identifier, a control resource set, a search space, a number of search space repetitions, a search space repetition pattern, a control channel element aggregation level candidate, a random access response window length, or some combination thereof.

In some cases, the at least one downlink message is transmitted based on the transmitted configuration and the identified repetition level. In some cases, the configuration is transmitted in remaining minimum system information. In some cases, each group of random access channel opportunities of the set of groups of random access channel opportunities are associated with a physical uplink shared channel transmission scheme. In some cases, the downlink message is transmitted based on the transmitted configuration. In some cases, the configuration is transmitted in remaining minimum system information.

Figure 13:
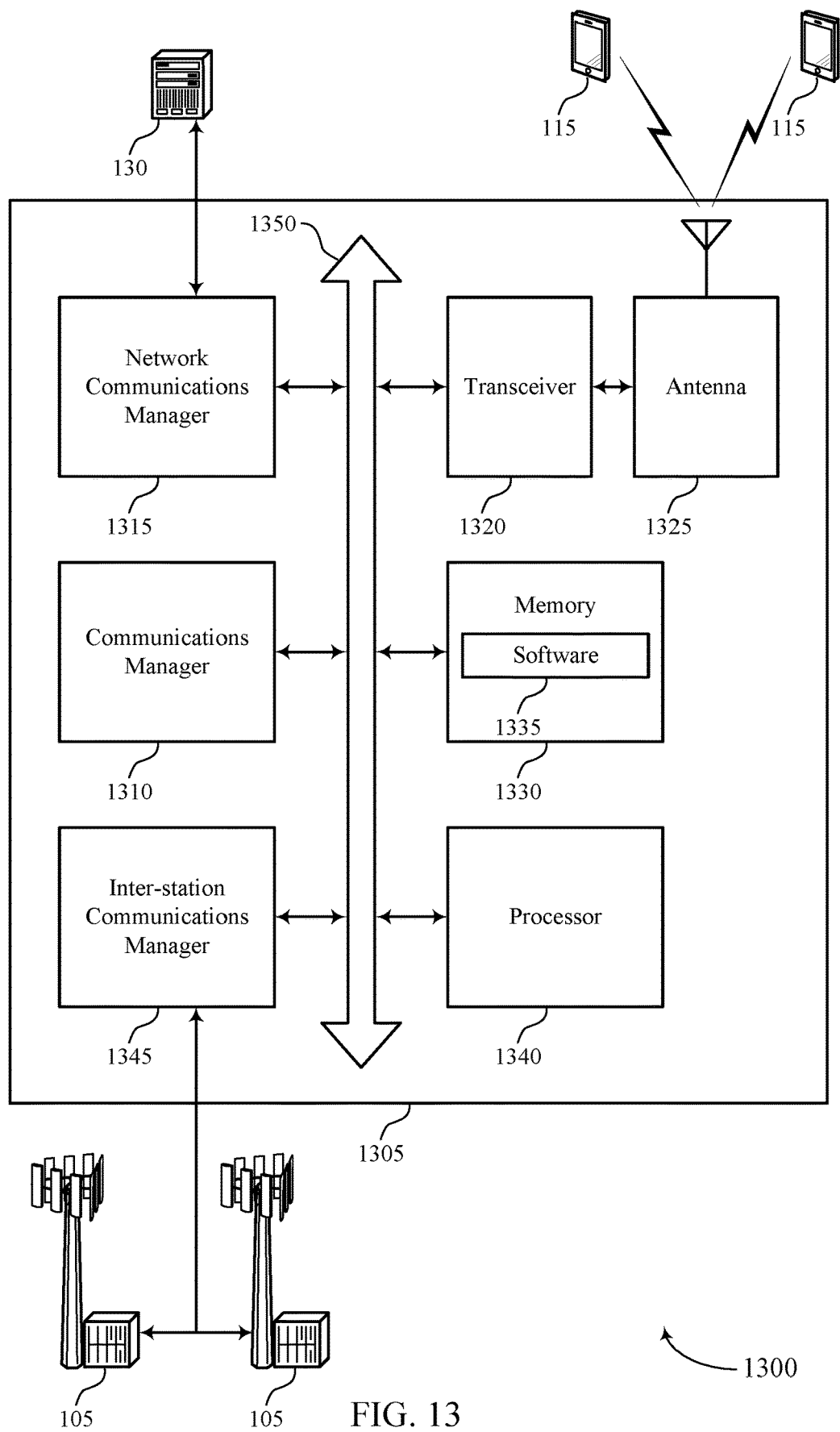
FIG. 13 shows a diagram of a system including a device that supports NR-Light RAR repetition in accordance with aspects of the present disclosure.

FIG. 13 shows a diagram of a system 1300 including a device 1305 that supports NR-Light RAR repetition in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may receive a preamble sequence associated with a preamble sequence group of a group of random access channel opportunities, identify a repetition level associated with the preamble sequence group, and transmit at least one downlink message associated with a random access channel procedure based on the received preamble sequence and the identified repetition level. The communications manager 1310 may also receive a first message associated with a random access channel procedure, transmit the downlink message based on the received first message and the determined repetition level preference, and determine a repetition level preference for a downlink message associated with the random access channel procedure based on the received first message.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code or software 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting NR-Light RAR repetition).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The software 1335 may include instructions to implement aspects of the present disclosure, including instructions to support wireless communications. The software 1335 may be stored in a non-transitory computer-readable medium such as system memory or other type of memory. In some cases, the software 1335 may not be directly executable by the processor 1340 but may cause a computer (e.g., when compiled and executed) to perform functions described herein.

Figure 14:
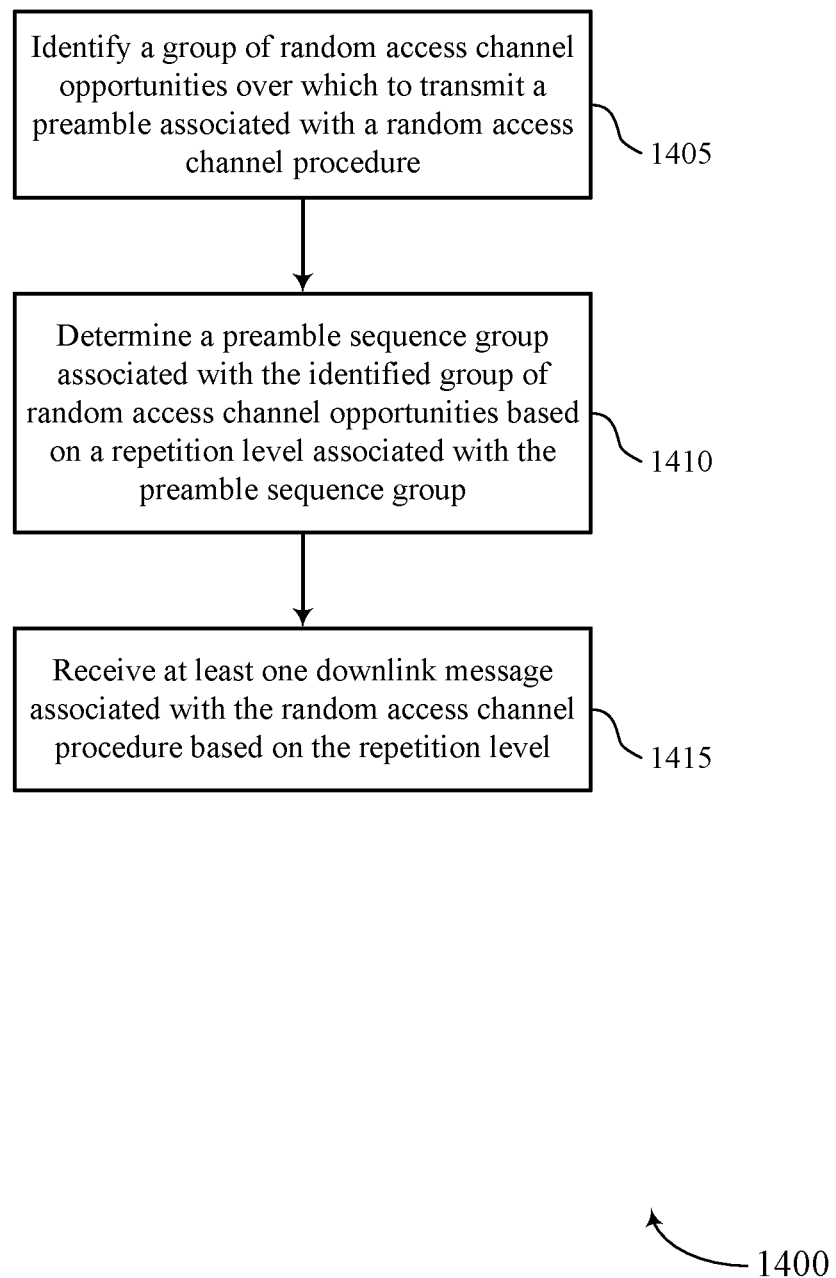
FIGS. 14 through 19 show flowcharts illustrating methods that support NR-Light RAR repetition in accordance with aspects of the present disclosure.

FIG. 14 shows a flowchart illustrating a method 1400 that supports NR-Light RAR repetition in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may identify a group of random access channel opportunities over which to transmit a preamble associated with a random access channel procedure. The operations of 1405 may be performed according to the methods described herein. In some examples, aspects of the operations of 1405 may be performed by a RO group manager as described with reference to FIGS. 6 through 9.

At 1410, the UE may determine a preamble sequence group associated with the identified group of random access channel opportunities based on a repetition level associated with the preamble sequence group. The operations of 1410 may be performed according to the methods described herein. In some examples, aspects of the operations of 1410 may be performed by a preamble sequence group manager as described with reference to FIGS. 6 through 9.

At 1415, the UE may receive at least one downlink message associated with the random access channel procedure based on the repetition level. The operations of 1415 may be performed according to the methods described herein. In some examples, aspects of the operations of 1415 may be performed by a random access manager as described with reference to FIGS. 6 through 9.

Figure 15:
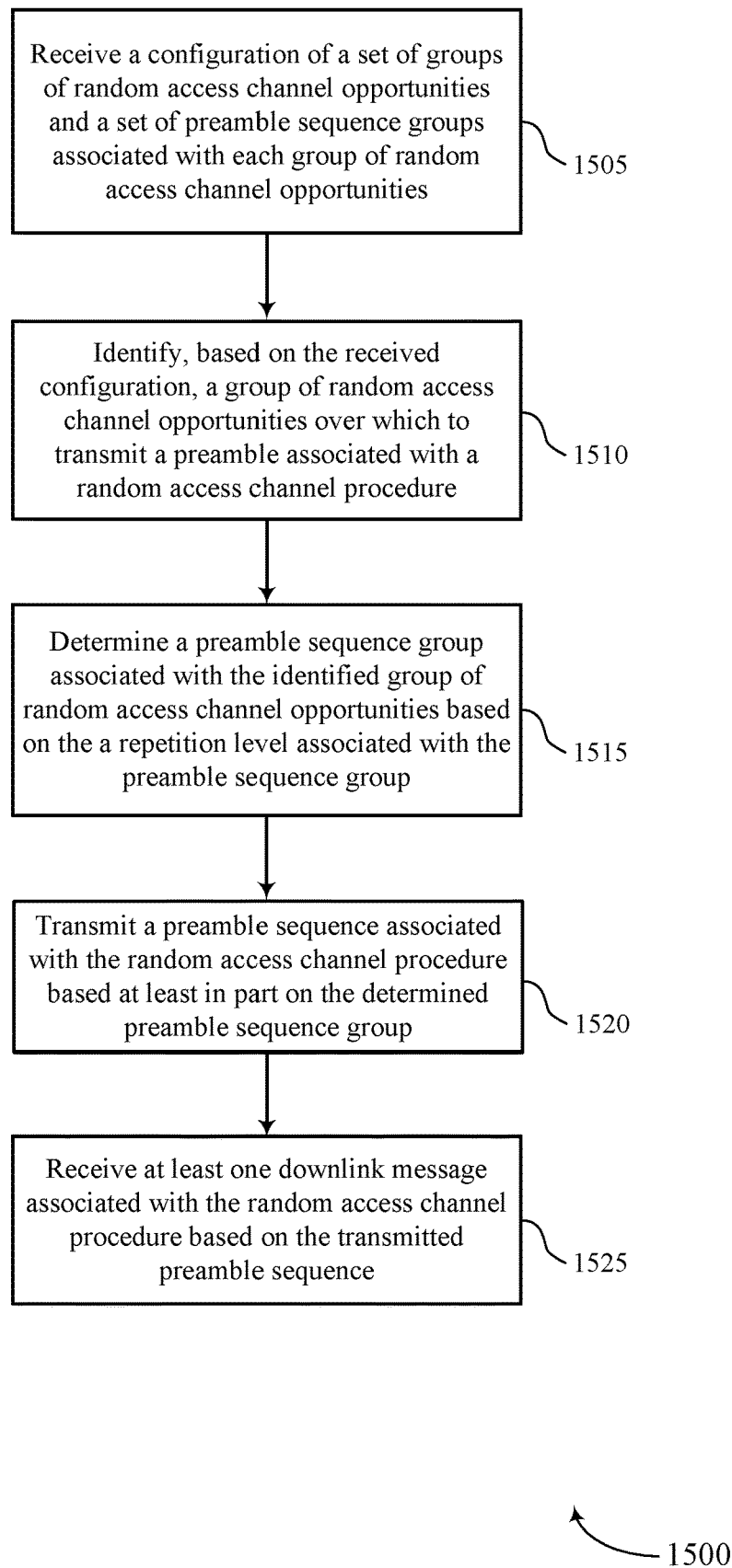

FIG. 15 shows a flowchart illustrating a method 1500 that supports NR-Light RAR repetition in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive a configuration of a set of groups of random access channel opportunities and a set of preamble sequence groups associated with each group of random access channel opportunities. The operations of 1505 may be performed according to the methods described herein. In some examples, aspects of the operations of 1505 may be performed by a RO group manager as described with reference to FIGS. 6 through 9.

At 1510, the UE may identify, based on the received configuration, a group of random access channel opportunities over which to transmit a preamble associated with a random access channel procedure. The operations of 1510 may be performed according to the methods described herein. In some examples, aspects of the operations of 1510 may be performed by a RO group manager as described with reference to FIGS. 6 through 9.

At 1515, the UE may determine a preamble sequence group associated with the identified group of random access channel opportunities based on a repetition level associated with the preamble sequence group (e.g., based on repetition levels, which may be identified based on the received configuration, associated with respective preamble sequence groups associated with the group of random access channel opportunities identified at 1510). The operations of 1515 may be performed according to the methods described herein. In some examples, aspects of the operations of 1515 may be performed by a preamble sequence group manager as described with reference to FIGS. 6 through 9.

At 1520, the UE may transmit a preamble sequence associated with the random access channel procedure based at least in part on the determined preamble sequence group. The operations of 1520 may be performed according to the methods described herein. In some examples, aspects of the operations of 1520 may be performed by a random access manager or a preamble sequence manager as described with reference to FIGS. 6 through 9.

At 1525, the UE may receive at least one downlink message associated with the random access channel procedure based on the transmitted preamble sequence. The operations of 1525 may be performed according to the methods described herein. In some examples, aspects of the operations of 1525 may be performed by a random access manager as described with reference to FIGS. 6 through 9.

Figure 16:
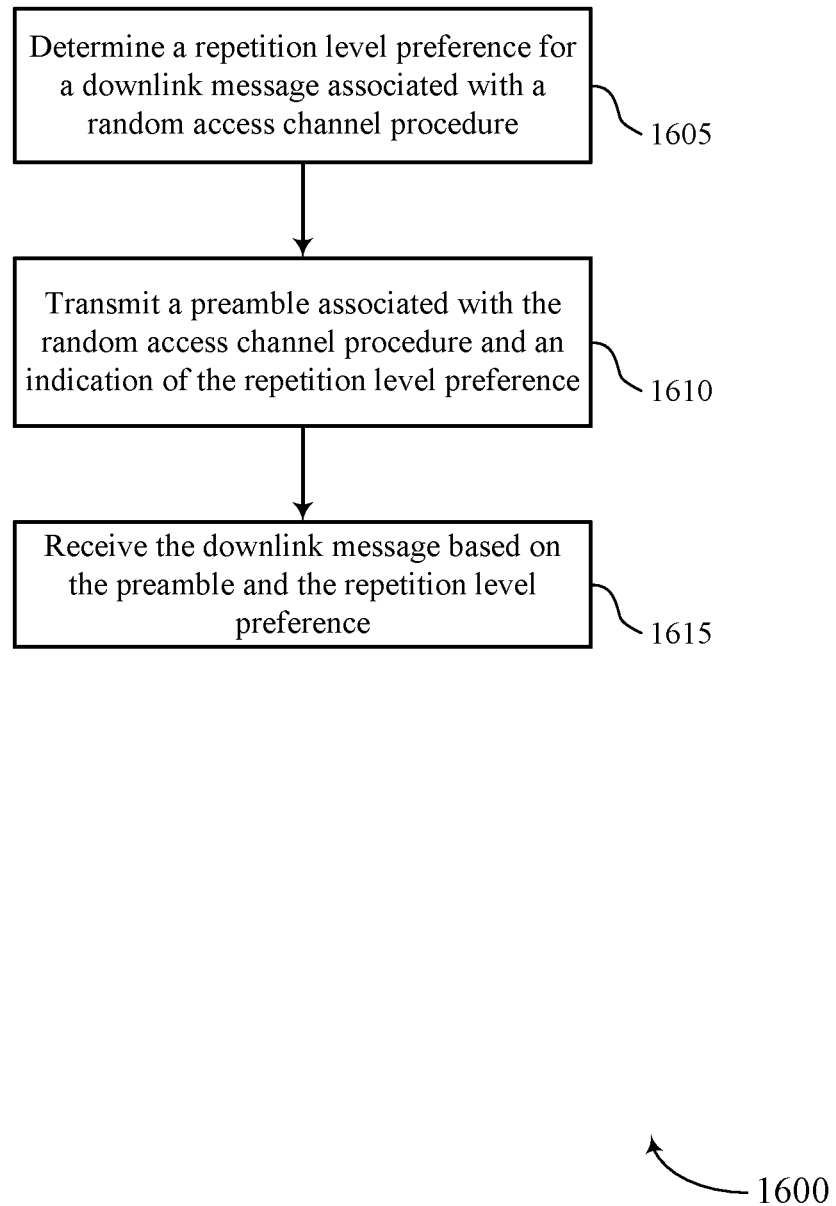

FIG. 16 shows a flowchart illustrating a method 1600 that supports NR-Light RAR repetition in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may determine a repetition level preference for a downlink message associated with a random access channel procedure. The operations of 1605 may be performed according to the methods described herein. In some examples, aspects of the operations of 1605 may be performed by a repetition level manager as described with reference to FIGS. 6 through 9.

At 1610, the UE may transmit a preamble associated with the random access channel procedure and an indication of the repetition level preference. The operations of 1610 may be performed according to the methods described herein. In some examples, aspects of the operations of 1610 may be performed by a random access manager as described with reference to FIGS. 6 through 9.

At 1615, the UE may receive the downlink message based on the preamble and the repetition level preference. The operations of 1615 may be performed according to the methods described herein. In some examples, aspects of the operations of 1615 may be performed by a random access manager as described with reference to FIGS. 6 through 9.

Figure 17:
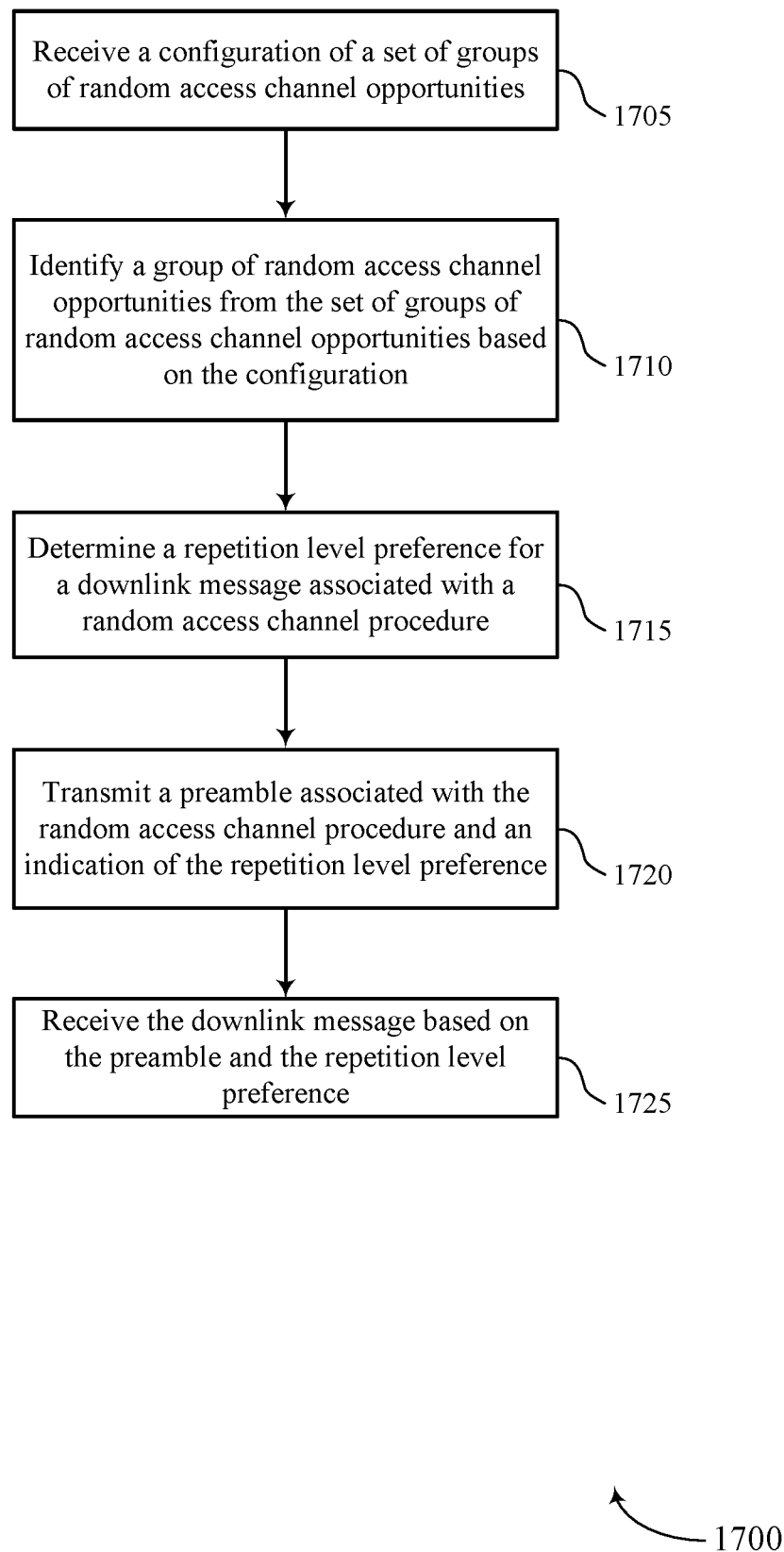

FIG. 17 shows a flowchart illustrating a method 1700 that supports NR-Light RAR repetition in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may receive a configuration of a set of groups of random access channel opportunities. The operations of 1705 may be performed according to the methods described herein. In some examples, aspects of the operations of 1705 may be performed by a RO group manager as described with reference to FIGS. 6 through 9.

At 1710, the UE may identify a group of random access channel opportunities from the set of groups of random access channel opportunities based on the configuration. The operations of 1710 may be performed according to the methods described herein. In some examples, aspects of the operations of 1710 may be performed by a RO group manager as described with reference to FIGS. 6 through 9.

At 1715, the UE may determine a repetition level preference for a downlink message associated with a random access channel procedure. The operations of 1715 may be performed according to the methods described herein. In some examples, aspects of the operations of 1715 may be performed by a repetition level manager as described with reference to FIGS. 6 through 9.

At 1720, the UE may transmit a preamble associated with the random access channel procedure and an indication of the repetition level preference (e.g., based on the identified group of random access channel opportunities). The operations of 1720 may be performed according to the methods described herein. In some examples, aspects of the operations of 1720 may be performed by a random access manager as described with reference to FIGS. 6 through 9.

At 1725, the UE may receive the downlink message based on the preamble and the repetition level preference. The operations of 1725 may be performed according to the methods described herein. In some examples, aspects of the operations of 1725 may be performed by a random access manager as described with reference to FIGS. 6 through 9.

Figure 18:
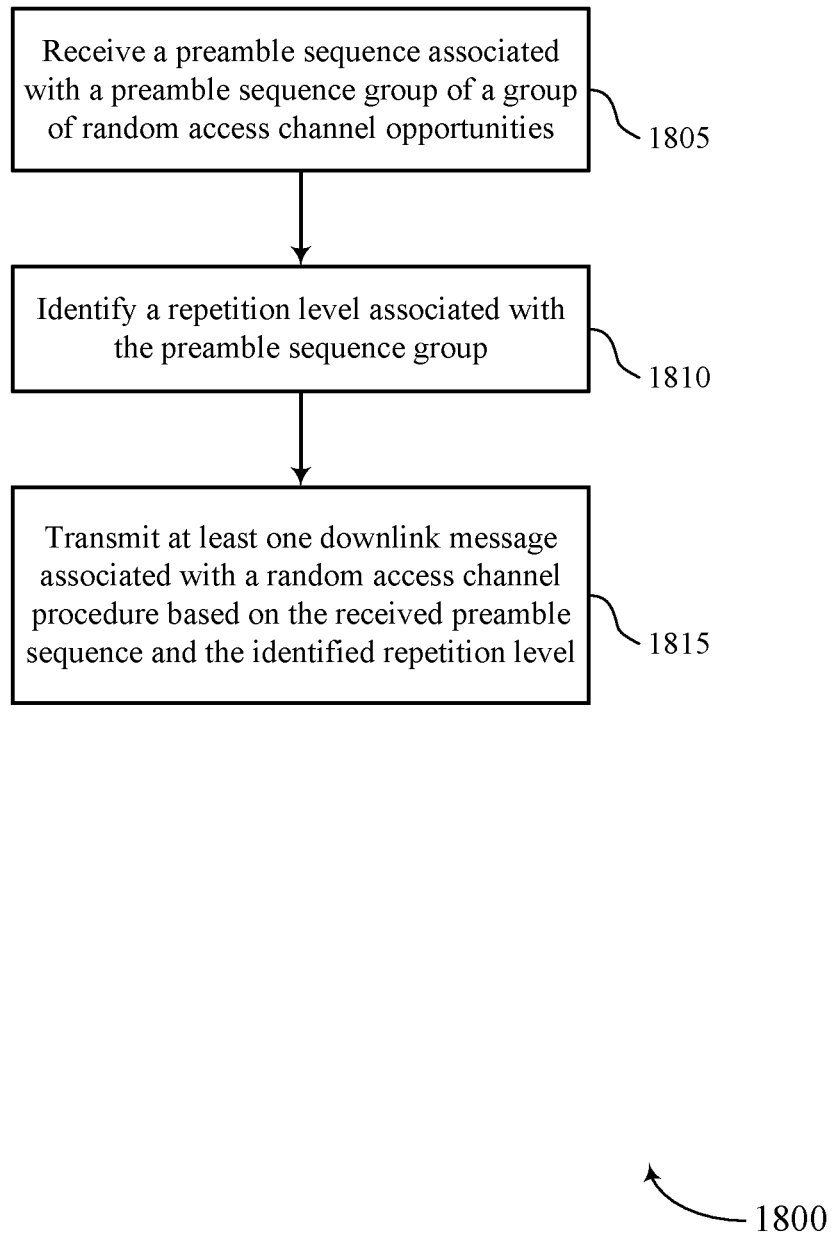

FIG. 18 shows a flowchart illustrating a method 1800 that supports NR-Light RAR repetition in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may receive a preamble sequence associated with a preamble sequence group of a group of random access channel opportunities. The operations of 1805 may be performed according to the methods described herein. In some examples, aspects of the operations of 1805 may be performed by a preamble sequence manager as described with reference to FIGS. 10 through 13.

At 1810, the base station may identify a repetition level associated with the preamble sequence group. The operations of 1810 may be performed according to the methods described herein. In some examples, aspects of the operations of 1810 may be performed by a repetition level manager as described with reference to FIGS. 10 through 13.

At 1815, the base station may transmit at least one downlink message associated with a random access channel procedure based on the received preamble sequence and the identified repetition level. The operations of 1815 may be performed according to the methods described herein. In some examples, aspects of the operations of 1815 may be performed by a random access manager as described with reference to FIGS. 10 through 13.

Figure 19:
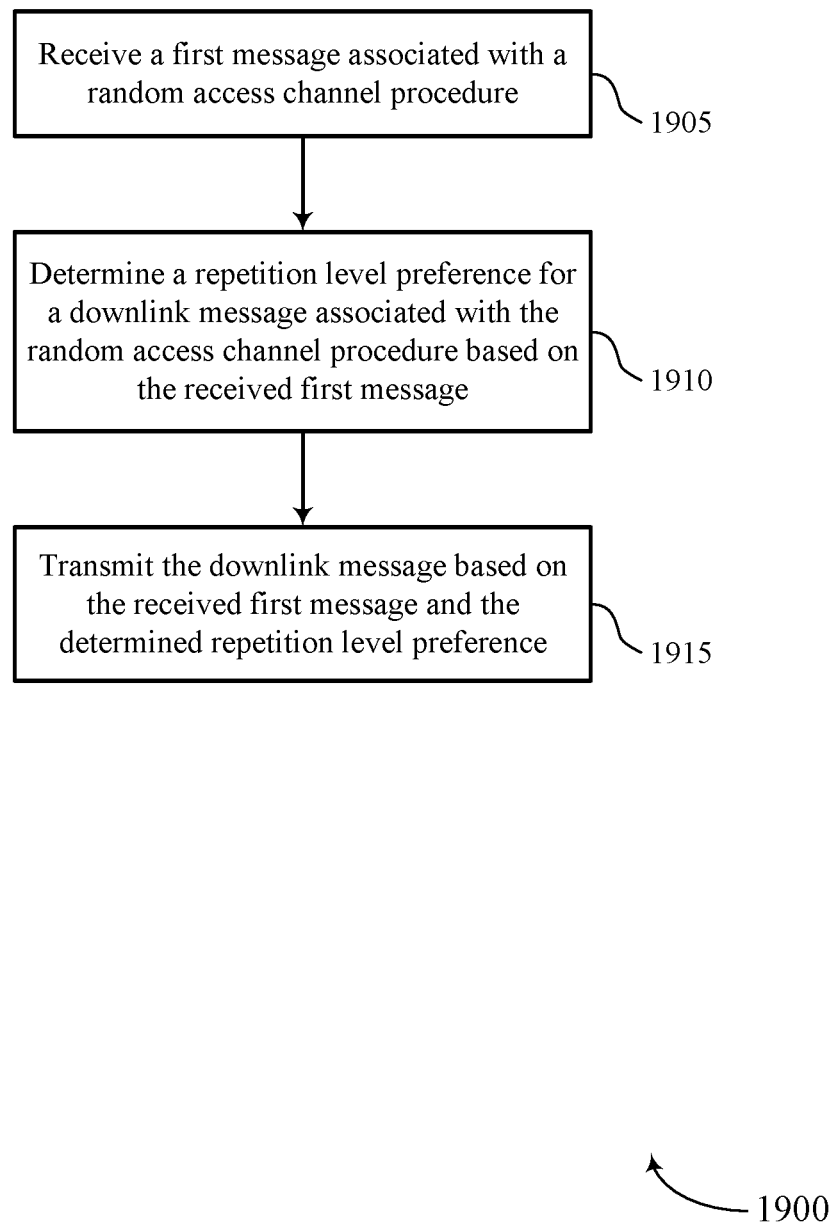

FIG. 19 shows a flowchart illustrating a method 1900 that supports NR-Light RAR repetition in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may receive a first message associated with a random access channel procedure. The operations of 1905 may be performed according to the methods described herein. In some examples, aspects of the operations of 1905 may be performed by a random access manager as described with reference to FIGS. 10 through 13.

At 1910, the base station may determine a repetition level preference for a downlink message associated with the random access channel procedure based on the received first message. The operations of 1910 may be performed according to the methods described herein. In some examples, aspects of the operations of 1910 may be performed by a repetition level manager as described with reference to FIGS. 10 through 13.

At 1915, the base station may transmit the downlink message based on the received first message and the determined repetition level preference. The operations of 1915 may be performed according to the methods described herein. In some examples, aspects of the operations of 1915 may be performed by a random access manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE), comprising:
   one or more processors,
   one or more memories coupled with the one or more processors; and
   instructions stored in the one or more memories and executable by the one or more processors to cause the apparatus to:

identify a group of random access channel opportunities over which to transmit a preamble associated with a random access channel procedure, wherein the group of random access channel opportunities is identified based at least in part on a repetition level preference of the UE;

determine a preamble sequence group associated with the identified group of random access channel opportunities based at least in part on the repetition level preference associated with the preamble sequence group; and receive at least one downlink message associated with the random access channel procedure based at least in part on the repetition level preference.

2. The apparatus of claim 1, wherein the instructions are further executable by the one or more processors to cause the apparatus to:

receive a configuration of a plurality of groups of random access channel opportunities and a plurality of preamble sequence groups associated with each group of random access channel opportunities, wherein the group of random access channel opportunities is identified based at least in part on the received configuration.

3. The apparatus of claim 2, wherein the configuration includes repetition level parameters for each preamble sequence of the plurality of preamble sequence groups associated with each group of random access channel opportunities.

4. The apparatus of claim 3, wherein the repetition level parameters comprise a random access radio network temporary identifier, a control resource set, a search space, a number of search space repetitions, a search space repetition pattern, a control channel element aggregation level candidate, a random access response window length, or some combination thereof.

5. The apparatus of claim 2, wherein the at least one downlink message is received based at least in part on the received configuration and the determined preamble sequence group.

6. The apparatus of claim 2, wherein the configuration is received in remaining minimum system information.

7. The apparatus of claim 1, wherein the instructions are further executable by the one or more processors to cause the apparatus to:

perform one or more signal reception quality measurements associated with a downlink signal on a downlink channel, wherein the preamble sequence group is determined based at least in part on the one or more signal reception quality measurements.

8. The apparatus of claim 1, wherein the instructions are further executable by the one or more processors to cause the apparatus to:

identify a reception capability of the UE, wherein the preamble sequence group is determined based at least in part on the reception capability.

9. The apparatus of claim 1, wherein the instructions are further executable by the one or more processors to cause the apparatus to:

select the preamble sequence group from a plurality of preamble sequence groups associated with the identified group of random access channel opportunities based at least in part on the repetition level preference for the at least one downlink message, wherein each preamble sequence group of the plurality of preamble sequence groups is associated with a different repetition level for the at least one downlink message.

10. The apparatus of claim 9, wherein the instructions are further executable by the one or more processors to cause the apparatus to:

perform one or more signal reception quality measurements associated with a downlink signal on a downlink channel; and select the group of random access channel opportunities from a plurality of groups of random access channel opportunities based at least in part on the one or more signal reception quality measurements, wherein the preamble sequence group is selected from the plurality of preamble sequence groups associated with the selected group of random access channel opportunities.

11. The apparatus of claim 9, wherein the instructions are further executable by the one or more processors to cause the apparatus to:

identify a transmission capability of the UE; and select the group of random access channel opportunities from a plurality of groups of random access channel opportunities based at least in part on the transmission capability of the UE, wherein the preamble sequence group is selected from the plurality of preamble sequence groups associated with the selected group of random access channel opportunities.

12. The apparatus of claim 9, wherein the repetition level preference for the at least one downlink message is different from a second repetition level preference for at least one uplink message associated with the random access channel procedure.

13. The apparatus of claim 1, wherein the instructions are further executable by the one or more processors to cause the apparatus to:

transmit a preamble sequence based at least in part on the determined preamble sequence group, wherein the at least one downlink message is received based at least in part on the transmitting.

14. The apparatus of claim 1, wherein the at least one downlink message comprises a message 2 of a four step random access channel procedure.

15. An apparatus for wireless communication at a user equipment (UE), comprising:

one or more processors, one or more memories coupled with the one or more processors; and instructions stored in the one or more memories and executable by the one or more processors to cause the apparatus to:

determine a repetition level preference for a downlink message associated with a random access channel procedure;

transmit a preamble associated with the random access channel procedure and an indication of the repetition level preference, wherein the indication of the repetition level preference is transmitted in a physical uplink shared channel message or in radio resource control signaling, a medium access control control element, uplink control information, or some combination thereof; and receive the downlink message based at least in part on the preamble and the repetition level preference.

16. The apparatus of claim 15, wherein the instructions are further executable by the one or more processors to cause the apparatus to:

receive a configuration of a plurality of groups of random access channel opportunities; and identify a group of random access channel opportunities from the plurality of groups of random access channel opportunities based at least in part on the configuration, wherein the preamble and the indication are transmitted based at least in part on the identified group of random access channel opportunities.

17. The apparatus of claim 16, wherein each group of random access channel opportunities of the plurality of groups of random access channel opportunities is associated with a physical uplink shared channel transmission scheme, wherein the indication is transmitted based at least in part on the physical uplink shared channel transmission scheme corresponding to the identified group of random access channel opportunities.

18. The apparatus of claim 16, wherein the downlink message is received based at least in part on the received configuration.

19. The apparatus of claim 16, wherein the configuration is received in remaining minimum system information.

20. The apparatus of claim 15, wherein the downlink message comprises a message B of a two step random access control channel procedure.

21. An apparatus for wireless communication at a network entity, comprising:
one or more processors,
one or more memories coupled with the one or more processors; and
instructions stored in the one or more memories and executable by the one or more processors to cause the apparatus to:
transmit a configuration of a plurality of groups of random access channel opportunities and a plurality of preamble sequence groups associated with each group of random access channel opportunities;
receive a preamble sequence associated with a preamble sequence group of the plurality of preamble sequence groups, the preamble sequence group associated with a group of random access channel opportunities of the plurality of groups of random access channel opportunities;
identify, based at least in part on the transmitted configuration, a repetition level preference associated with the preamble sequence group; and
transmit, based at least in part on the transmitted configuration and the identified repetition level preference, at least one downlink message associated with a random access channel procedure based at least in part on the received preamble sequence and the identified repetition level preference.

22. The apparatus of claim 21, wherein the configuration includes repetition level parameters for each preamble sequence of the plurality of preamble sequence groups associated with each group of random access channel opportunities, wherein the repetition level parameters comprise a random access radio network temporary identifier, a control resource set, a search space, a number of search space repetitions, a search space repetition pattern, a control channel element aggregation level candidate, a random access response window length, or some combination thereof.

23. The apparatus of claim 21, wherein the configuration is transmitted in remaining minimum system information.

24. An apparatus for wireless communication at a network entity, comprising:
one or more processors,
one or more memories coupled with the one or more processors; and
instructions stored in the one or more memories and executable by the one or more processors to cause the apparatus to:
transmit a configuration of a plurality of groups of random access channel opportunities;
receive, based at least in part on the transmitted configuration, a first message associated with a random access channel procedure;
determine a repetition level preference for a downlink message associated with the random access channel procedure based at least in part on the received first message, wherein the first message comprises a preamble associated with the random access channel procedure and an indication of the repetition level preference; and
transmit the downlink message based at least in part on the received first message and the determined repetition level preference.

25. The apparatus of claim 24, wherein each group of random access channel opportunities of the plurality of groups of random access channel opportunities are associated with a physical uplink shared channel transmission scheme.

26. The apparatus of claim 24, wherein the downlink message is transmitted based at least in part on the transmitted configuration.

27. The apparatus of claim 24, wherein the configuration is transmitted in remaining minimum system information.

28. The apparatus of claim 24, wherein the instructions are further executable by the one or more processors to cause the apparatus to:
identify a decoding failure associated with the indication of the repetition level preference, wherein the downlink message comprises a fallback random access response message based at least in part on the decoding failure, wherein the fallback random access response message is transmitted according to a maximum downlink repetition level configuration, and wherein the fallback random access response message comprises a four step random access channel procedure fall back command or an uplink grant for an uplink shared channel retransmission.

29. A method for wireless communication at a user equipment (UE), comprising:
identifying a group of random access channel opportunities over which to transmit a preamble associated with a random access channel procedure, wherein the group of random access channel opportunities is identified based at least in part on a repetition level preference of the UE;
determining a preamble sequence group associated with the identified group of random access channel opportunities based at least in part on the repetition level preference associated with the preamble sequence group; and
receiving at least one downlink message associated with the random access channel procedure based at least in part on the repetition level preference.

* * * * *